(12) United States Patent
Maksimov et al.

(10) Patent No.: US 12,065,089 B1
(45) Date of Patent: Aug. 20, 2024

(54) ON-BOARD DIAGNOSTICS (OBD) PROGRAMMING ASSIST DEVICES AND METHODS OF ASSEMBLING AND USING THE SAME

(71) Applicant: OBD Solutions LLC, Phoenix, AZ (US)

(72) Inventors: Vitaliy Vladimirovich Maksimov, Phoenix, AZ (US); Matthew Arnold Lynch, Phoenix, AZ (US); Vitaliy Chetverikov, Phoenix, AZ (US); Jason Darwin Smith, Phoenix, AZ (US); Mark Anthony Mayo Palomer, Phoenix, AZ (US)

(73) Assignee: OBD Solutions LLC, Phoenix, AZ (US)

( * ) Notice: Subject to any disclaimer, the term of this patent is extended or adjusted under 35 U.S.C. 154(b) by 0 days.

(21) Appl. No.: 18/444,914

(22) Filed: Feb. 19, 2024

Related U.S. Application Data

(60) Provisional application No. 63/485,586, filed on Feb. 17, 2023.

(51) Int. Cl.
*B60R 16/023* (2006.01)
*G01M 15/02* (2006.01)
*G07C 5/00* (2006.01)
*H04W 4/20* (2018.01)

(52) U.S. Cl.
CPC ......... *B60R 16/0234* (2013.01); *G01M 15/02* (2013.01); *G07C 5/006* (2013.01); *H04W 4/203* (2013.01)

(58) Field of Classification Search
CPC .... B60R 16/0234; G01M 15/02; G07C 5/006; H04W 4/203
USPC ........................................................ 340/438
See application file for complete search history.

(56) References Cited

U.S. PATENT DOCUMENTS

| | | | |
|---|---|---|---|
| 11,710,354 B1* | 7/2023 | Schafer | H04L 67/12 701/32.6 |
| 11,954,948 B1* | 4/2024 | Herron | B60R 16/0238 |
| 2006/0149436 A1* | 7/2006 | Bertosa | G07C 5/008 701/31.4 |
| 2008/0082221 A1* | 4/2008 | Nagy | G07C 5/0808 701/2 |
| 2009/0063745 A1* | 3/2009 | Morris | G06F 1/1632 710/304 |
| 2012/0053901 A1* | 3/2012 | Arefeen | G05B 23/0213 702/183 |
| 2014/0052531 A1* | 2/2014 | Kent | G06Q 30/02 701/31.5 |
| 2016/0210794 A1* | 7/2016 | Fazi | B60W 10/00 |

(Continued)

*Primary Examiner* — Kerri L McNally
(74) *Attorney, Agent, or Firm* — NK Patent Law

(57) ABSTRACT

Disclosed herein are methods, systems, and devices for assisting programming of vehicles via on-board diagnostics (OBD) ports. In one embodiment, a programming assist device includes a first interface configured to be electrically coupled with an OBD port of a vehicle, power converter circuitry, and a second interface configured to be communicatively coupled with a vehicle diagnostic device. The power converter circuitry is configured for receiving a first voltage signal from a first pin of the first interface and providing a second voltage signal to a second pin of the first interface. The second voltage signal is configured to facilitate a programming mode for the vehicle.

20 Claims, 20 Drawing Sheets

(56) References Cited

U.S. PATENT DOCUMENTS

| | | | |
|---|---|---|---|
| 2017/0084088 A1* | 3/2017 | Reichardt | G07C 5/008 |
| 2018/0225249 A1* | 8/2018 | Lambourne | G06F 13/4022 |
| 2020/0005563 A1* | 1/2020 | Zaccherini | G07C 5/008 |
| 2020/0202645 A1* | 6/2020 | Gintz | G07C 5/0825 |
| 2021/0012587 A1* | 1/2021 | Qu | G07C 5/0808 |
| 2022/0385747 A1* | 12/2022 | Edgar | H04L 1/0002 |
| 2024/0062593 A1* | 2/2024 | Sizemore | G07C 5/008 |

* cited by examiner

FIG. 10

ON-BOARD DIAGNOSTICS (OBD) PROGRAMMING ASSIST DEVICES AND METHODS OF ASSEMBLING AND USING THE SAME

PRIORITY CLAIM

This application claims priority to U.S. Provisional Patent Application Ser. No. 63/485,586 filed Feb. 17, 2023, entitled "ON-BOARD DIAGNOSTICS (OBD) PROGRAMMING ASSIST DEVICES." The disclosure of the aforementioned application is incorporated herein by reference in its entirety.

TECHNICAL FIELD

The present invention relates generally to on-board diagnostics (OBD) systems. More particularly, devices are disclosed for assisting programming of OBD enabled vehicles.

BACKGROUND

On-board diagnostics (OBD) is a computer-based system originally designed to reduce emissions by monitoring the performance of major engine components. A basic OBD system includes an electronic control unit (ECU). The ECU uses input from various sensors (e.g., oxygen sensors, etc.) to control the actuators (e.g., fuel injectors, etc.) to get the desired performance. The Check Engine light, also known as the malfunction indicator light (MIL), provides an early warning of malfunctions to a vehicle owner. Modern vehicles support hundreds of parameters. These parameters may be accessed via the OBD Port using a device called a scan tool.

There are two generations of OBD systems. OBD-I refers to the first generation OBD systems which were developed throughout the 1980s. These first generation systems used proprietary connectors, hardware interfaces, and protocols. A mechanic that wanted to access diagnostic information typically had to buy a different OBD-I tool for each vehicle make. Even OBD-I scan tools that support multiple protocols are supplied with an array of different adapter cables. In the early 1990s, the Society of Automotive Engineers (SAE) and the International Standardization Organization (ISO) issued a set of standards (OBD-II). OBD-II standards describe the interchange of digital information between ECUs and a diagnostic scan tool. All OBD-II compliant vehicles were required to use a standard diagnostic connector (SAE J1962) and communicate via one of the standard OBD-II communication protocols. OBD-II was first introduced in model year 1994 vehicles and became a requirement for all cars and light trucks starting in model year 1996.

SUMMARY

Methods, systems, and devices are disclosed herein for assisting programming of vehicles via on-board diagnostics (OBD) ports. In one embodiment, a programming assist device includes a first interface configured to be electrically coupled with an OBD port of a vehicle, power converter circuitry, and a second interface configured to be communicatively coupled with a vehicle diagnostic device. The power converter circuitry is configured for receiving a first voltage signal from a first pin of the first interface and providing a second voltage signal to a second pin of the first interface. The second voltage signal is configured to facilitate a programming mode for the vehicle.

In some embodiments, the programming assist device may further include over-voltage protection circuitry electrically coupled between the first pin of the first interface and the power converter circuitry. In further embodiments, the programming assist device may further include voltage regulator and over-current protection circuitry electrically coupled between the power converter circuitry and the second pin of the first interface. In still further embodiments, the programming assist device may further include output shutoff circuitry electrically coupled between the voltage regulator and over-current protection circuitry and the second pin of the first interface.

In some embodiments, the programming assist device may further include a controller circuitry. The controller circuitry may be configured for providing a switched signal to the power converter circuitry. Additionally, the controller circuitry may be configured for receiving an enable command signal from the second interface; and upon receiving the enable command signal, deactivating the output shutoff circuitry. In further embodiments, the switched signal may have a fixed duty cycle. The fixed duty cycle may be between forty percent and sixty percent. In still further embodiments, the switched signal may have a fixed duty cycle of approximately fifty percent. In other embodiments, the fixed duty cycle may be less than forty percent or greater than sixty percent. In still further embodiments, the switched digital signal may have a variable duty cycle. The variable duty cycle may be between ten percent and ninety percent.

In some embodiments, the first interface may be compliant to at least one version of Society of Automotive Engineers (SAE) J1962 standard. In additional embodiments, the second interface may be compliant to at least one version of Society of Automotive Engineers (SAE) J1962 standard. In other embodiments, the second interface may be a wireless interface.

In some embodiments, the second interface may include a personal area network (PAN) interface. In further embodiments, the PAN interface may be compliant to at least one version of a Bluetooth® standard. In other embodiments, the PAN interface may be compliant to at least one version of a Universal Serial Bus® (USB) standard.

In some embodiments, the second interface may include a local area network (LAN) interface. In certain embodiments, the LAN interface may be compliant to at least one version of an Institute of Electrical and Electronics Engineers (IEEE) 802.11 standard. In other embodiments, the LAN interface may be compliant to at least one version of an IEEE 802.3 standard.

In some embodiments, the second interface may include a wide area network (WAN) interface. In further embodiments, the WAN interface may be compliant to at least one version of a 2G, 3G, 4G, or 5G Third Generation Partnership Project (3GPP) cellular standard.

In some embodiments, the controller circuitry may be further configured for determining a second voltage abnormal condition associated with the second voltage signal and activating the output shutoff circuitry upon determining the second voltage abnormal condition.

In some embodiments, the power converter circuitry may be configured as a voltage doubling converter. In further embodiments, the power converter circuitry may be configured as a charge pump direct current (DC) to DC converter.

In some embodiments, the vehicle diagnostic device may include a smartphone, a smart tablet, a smart watch, or the like executing a vehicle diagnostic application.

In other embodiments, the vehicle diagnostic device may include a laptop, a personal computer (PC), or the like executing a vehicle diagnostic application.

In other embodiments, the vehicle diagnostic device may include at least one server executing a vehicle diagnostic application. In further embodiments, the vehicle diagnostic device may further include a client device communicatively coupled with the at least one server executing the vehicle diagnostic application.

In other embodiments, the vehicle diagnostic device includes an OBD interface device configured to be electrically coupled with the second interface and communicatively coupled with a computing device executing a vehicle diagnostic application.

In another embodiment, a method of operating a programming assist device having power converter circuitry is disclosed. The method includes electrically coupling a first interface of the programing assist device with an OBD port of a vehicle, communicatively coupling a second interface of the programming assist device with a vehicle diagnostic device, and initiating a programming mode of the vehicle via the vehicle diagnostic device. The power converter circuitry is configured for receiving a first voltage signal from a first pin of the first interface and providing a second voltage signal to a second pin of the first interface. The second voltage signal is configured to facilitate the programming mode for the vehicle.

In some embodiments, the programming assist device may further include over-voltage protection circuitry electrically coupled between the first pin of the first interface and the power converter circuitry. In further embodiments, the programming assist device may further include voltage regulator and over-current protection circuitry electrically coupled between the power converter circuitry and the second pin of the first interface. In still further embodiments, the programming assist device may further include output shutoff circuitry electrically coupled between the voltage regulator and over-current protection circuitry and the second pin of the first interface.

In some embodiments, the programming assist device may further include a controller circuitry. The controller circuitry may be configured for providing a switched signal to the power converter circuitry. Additionally, the controller circuitry may be configured for receiving an enable command signal from the second interface; and upon receiving the enable command signal, deactivating the output shutoff circuitry. In further embodiments, the switched signal may have a fixed duty cycle. The fixed duty cycle may be between forty percent and sixty percent. In still further embodiments, the switched signal may have a fixed duty cycle of approximately fifty percent. In other embodiments, the fixed duty cycle may be less than forty percent or greater than sixty percent. In still further embodiments, the switched digital signal may have a variable duty cycle. The variable duty cycle may be between ten percent and ninety percent.

In some embodiments, the first interface may be compliant to at least one version of Society of Automotive Engineers (SAE) J1962 standard. In additional embodiments, the second interface may be compliant to at least one version of Society of Automotive Engineers (SAE) J1962 standard. In other embodiments, the second interface may be a wireless interface.

In some embodiments, the second interface may include a personal area network (PAN) interface. In further embodiments, the PAN interface may be compliant to at least one version of a Bluetooth® standard. In other embodiments, the PAN interface may be compliant to at least one version of a Universal Serial Bus® (USB) standard.

In some embodiments, the second interface may include a local area network (LAN) interface. In certain embodiments, the LAN interface may be compliant to at least one version of an Institute of Electrical and Electronics Engineers (IEEE) 802.11 standard. In other embodiments, the LAN interface may be compliant to at least one version of an IEEE 802.3 standard.

In some embodiments, the second interface may include a wide area network (WAN) interface. In further embodiments, the WAN interface may be compliant to at least one version of a 2G, 3G, 4G, or 5G Third Generation Partnership Project (3GPP) cellular standard.

In some embodiments, the controller circuitry may be further configured for determining a second voltage abnormal condition associated with the second voltage signal and activating the output shutoff circuitry upon determining the second voltage abnormal condition.

In some embodiments, the power converter circuitry may be configured as a voltage doubling converter. In further embodiments, the power converter circuitry may be configured as a charge pump direct current (DC) to DC converter.

In some embodiments, the vehicle diagnostic device may include a smartphone, a smart tablet, a smart watch, or the like executing a vehicle diagnostic application.

In other embodiments, the vehicle diagnostic device may include a laptop, a personal computer (PC), or the like executing a vehicle diagnostic application.

In other embodiments, the vehicle diagnostic device may include at least one server executing a vehicle diagnostic application. In further embodiments, the vehicle diagnostic device may further include a client device communicatively coupled with the at least one server executing the vehicle diagnostic application.

In other embodiments, the vehicle diagnostic device includes an OBD interface device configured to be electrically coupled with the second interface and communicatively coupled with a computing device executing a vehicle diagnostic application.

In another embodiment, a method of assembling a programming assist device is disclosed. The method includes electrically coupling a first interface configured to be electrically coupled with an OBD port of a vehicle with power converter circuitry and electrically coupling a second interface configured to be communicatively coupled with a vehicle diagnostic device with the power converter circuitry. The power converter circuitry is configured for receiving a first voltage signal from a first pin of the first interface and providing a second voltage signal to a second pin of the first interface. The second voltage signal is configured to facilitate a programming mode for the vehicle.

In some embodiments, the programming assist device may further include over-voltage protection circuitry electrically coupled between the first pin of the first interface and the power converter circuitry. In further embodiments, the programming assist device may further include voltage regulator and over-current protection circuitry electrically coupled between the power converter circuitry and the second pin of the first interface. In still further embodiments, the programming assist device may further include output shutoff circuitry electrically coupled between the voltage regulator and over-current protection circuitry and the second pin of the first interface.

In some embodiments, the programming assist device may further include a controller circuitry. The controller circuitry may be configured for providing a switched signal to the power converter circuitry. Additionally, the controller circuitry may be configured for receiving an enable command signal from the second interface; and upon receiving the enable command signal, deactivating the output shutoff circuitry. In further embodiments, the switched signal may have a fixed duty cycle. The fixed duty cycle may be between forty percent and sixty percent. In still further embodiments, the switched signal may have a fixed duty cycle of approximately fifty percent. In other embodiments, the fixed duty cycle may be less than forty percent or greater than sixty percent. In still further embodiments, the switched digital signal may have a variable duty cycle. The variable duty cycle may be between ten percent and ninety percent.

In some embodiments, the first interface may be compliant to at least one version of Society of Automotive Engineers (SAE) J1962 standard. In additional embodiments, the second interface may be compliant to at least one version of Society of Automotive Engineers (SAE) J1962 standard. In other embodiments, the second interface may be a wireless interface.

In some embodiments, the second interface may include a personal area network (PAN) interface. In further embodiments, the PAN interface may be compliant to at least one version of a Bluetooth® standard. In other embodiments, the PAN interface may be compliant to at least one version of a Universal Serial Bus® (USB) standard.

In some embodiments, the second interface may include a local area network (LAN) interface. In certain embodiments, the LAN interface may be compliant to at least one version of an Institute of Electrical and Electronics Engineers (IEEE) 802.11 standard. In other embodiments, the LAN interface may be compliant to at least one version of an IEEE 802.3 standard.

In some embodiments, the second interface may include a wide area network (WAN) interface. In further embodiments, the WAN interface may be compliant to at least one version of a 2G, 3G, 4G, or 5G Third Generation Partnership Project (3GPP) cellular standard.

In some embodiments, the controller circuitry may be further configured for determining a second voltage abnormal condition associated with the second voltage signal and activating the output shutoff circuitry upon determining the second voltage abnormal condition.

In some embodiments, the power converter circuitry may be configured as a voltage doubling converter. In further embodiments, the power converter circuitry may be configured as a charge pump direct current (DC) to DC converter.

In some embodiments, the vehicle diagnostic device may include a smartphone, a smart tablet, a smart watch, or the like executing a vehicle diagnostic application.

In other embodiments, the vehicle diagnostic device may include a laptop, a personal computer (PC), or the like executing a vehicle diagnostic application.

In other embodiments, the vehicle diagnostic device may include at least one server executing a vehicle diagnostic application. In further embodiments, the vehicle diagnostic device may further include a client device communicatively coupled with the at least one server executing the vehicle diagnostic application.

In other embodiments, the vehicle diagnostic device includes an OBD interface device configured to be electrically coupled with the second interface and communicatively coupled with a computing device executing a vehicle diagnostic application.

In another embodiment, a method of operating a programming assist device having power converter circuitry is disclosed. The method includes electrically coupling a first interface of the programing assist device with an OBD port of a vehicle, communicatively coupling a second interface of the programming assist device with a vehicle diagnostic device, and initiating a programming mode of the vehicle via the vehicle diagnostic device. The power converter circuitry is configured for receiving a first voltage signal from a first pin of the first interface and providing a second voltage signal to a second pin of the first interface. The second voltage signal is configured to facilitate the programming mode for the vehicle.

In some embodiments, the programming assist device may further include over-voltage protection circuitry electrically coupled between the first pin of the first interface and the power converter circuitry. In further embodiments, the programming assist device may further include voltage regulator and over-current protection circuitry electrically coupled between the power converter circuitry and the second pin of the first interface. In still further embodiments, the programming assist device may further include output shutoff circuitry electrically coupled between the voltage regulator and over-current protection circuitry and the second pin of the first interface.

In some embodiments, the programming assist device may further include a controller circuitry. The controller circuitry may be configured for providing a switched signal to the power converter circuitry. Additionally, the controller circuitry may be configured for receiving an enable command signal from the second interface; and upon receiving the enable command signal, deactivating the output shutoff circuitry. In further embodiments, the switched signal may have a fixed duty cycle. The fixed duty cycle may be between forty percent and sixty percent. In still further embodiments, the switched signal may have a fixed duty cycle of approximately fifty percent. In other embodiments, the fixed duty cycle may be less than forty percent or greater than sixty percent. In still further embodiments, the switched digital signal may have a variable duty cycle. The variable duty cycle may be between ten percent and ninety percent.

In some embodiments, the first interface may be compliant to at least one version of Society of Automotive Engineers (SAE) J1962 standard. In additional embodiments, the second interface may be compliant to at least one version of Society of Automotive Engineers (SAE) J1962 standard. In other embodiments, the second interface may be a wireless interface.

In some embodiments, the second interface may include a personal area network (PAN) interface. In further embodiments, the PAN interface may be compliant to at least one version of a Bluetooth® standard. In other embodiments, the PAN interface may be compliant to at least one version of a Universal Serial Bus® (USB) standard.

In some embodiments, the second interface may include a local area network (LAN) interface. In certain embodiments, the LAN interface may be compliant to at least one version of an Institute of Electrical and Electronics Engineers (IEEE) 802.11 standard. In other embodiments, the LAN interface may be compliant to at least one version of an IEEE 802.3 standard.

In some embodiments, the second interface may include a wide area network (WAN) interface. In further embodiments, the WAN interface may be compliant to at least one version of a 2G, 3G, 4G, or 5G Third Generation Partnership Project (3GPP) cellular standard.

In some embodiments, the controller circuitry may be further configured for determining a second voltage abnormal condition associated with the second voltage signal and activating the output shutoff circuitry upon determining the second voltage abnormal condition.

In some embodiments, the power converter circuitry may be configured as a voltage doubling converter. In further embodiments, the power converter circuitry may be configured as a charge pump direct current (DC) to DC converter.

In some embodiments, the vehicle diagnostic device may include a smartphone, a smart tablet, a smart watch, or the like executing a vehicle diagnostic application.

In other embodiments, the vehicle diagnostic device may include a laptop, a personal computer (PC), or the like executing a vehicle diagnostic application.

In other embodiments, the vehicle diagnostic device may include at least one server executing a vehicle diagnostic application. In further embodiments, the vehicle diagnostic device may further include a client device communicatively coupled with the at least one server executing the vehicle diagnostic application.

In other embodiments, the vehicle diagnostic device includes an OBD interface device configured to be electrically coupled with the second interface and communicatively coupled with a computing device executing a vehicle diagnostic application.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 10 depicts a schematic diagram illustrating 5.0 volt regulator circuitry 1002 and 3.0 volt regulator circuitry (not shown in FIG. 1) in accordance with embodiments of the present disclosure.

DETAILED DESCRIPTION

Figure 1:
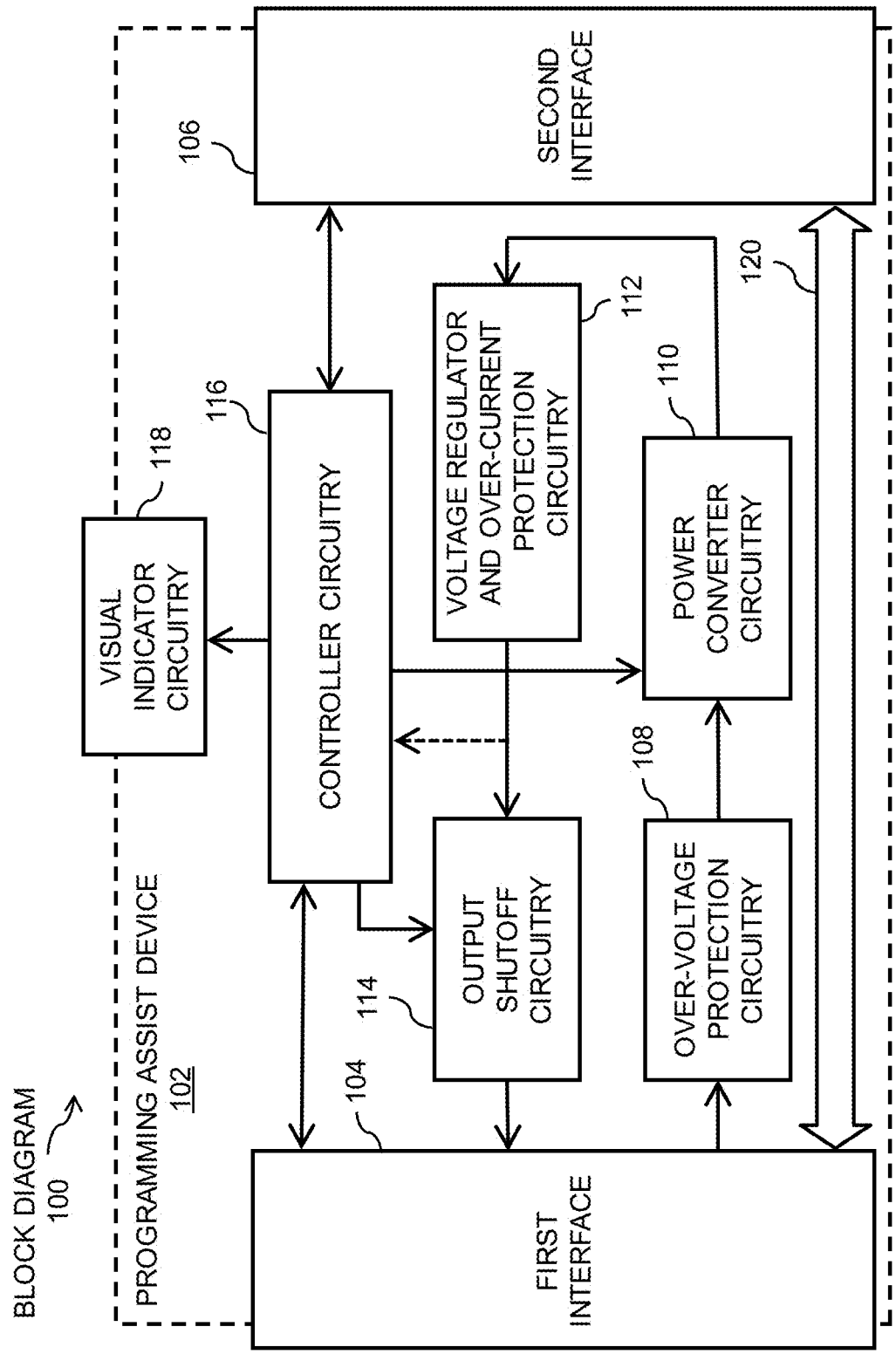
FIG. 1 depicts a block diagram illustrating a programming assist device having a first interface, a second interface, over-voltage protection circuitry, power converter circuitry, voltage regulator and over-current protection circuitry, output shutoff circuitry, controller circuitry, and visual indicator circuitry in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are devices for assisting programming of on-board computers within vehicles via their on-board diagnostics (OBD) ports. FIG. 1 depicts a block diagram 100 illustrating a programming assist device 102 in accordance with embodiments of the present disclosure.

The programming assist device 102 includes a first interface 104, a second interface 106, over-voltage protection circuitry 108, power converter circuitry 110, voltage regulator and over-current protection circuitry 112, and output shutoff circuitry 114. The first interface 104 is configured to be electrically coupled with an OBD port of a vehicle. The over-voltage protection circuitry 108 is electrically coupled between a first pin of the first interface 104 and an input to the power converter circuitry 110. The over-voltage protection circuitry 108 is configured to provide a first voltage signal to the power converter circuitry 110 from the first interface 102. The over voltage protection circuitry 108 is further configured to detect an over-voltage condition of the first voltage signal and reduce or disable the first voltage signal before being provided to the input of the power converter circuitry 110. The power converter circuitry 110 is configured to generate a second voltage signal for facilitating programming of the vehicle via the OBD port. The power converter circuitry 110 may include a voltage doubling direct current (DC) to DC converter. The voltage regulator and over-current protection circuitry 112 is coupled in series with the output shutoff circuitry 114 between an output of the power converter circuitry 110 and a second pin of the first interface. The voltage regulator and over-current protection circuitry 112 both regulates the second voltage signal to remain within an acceptable range for facilitating a programming mode for the vehicle and limits current provided to the second pin of the first interface during a fault condition.

The programming assist device 102 further includes controller circuitry 116 electrically coupled with visual indicator circuitry 118. The controller circuitry 116 is also electrically coupled with the output shutoff circuitry 114 and configured to remove or reduce the second voltage signal from the second pin of the first interface 104 during an inactive programming mode and/or detection of a fault condition. The controller circuitry 116 is further configured for providing a switched signal to the power converter circuitry 110. The switched signal facilitates the power converter circuitry 110 in generating the second voltage signal. The switched signal may have a fixed duty cycle between forty percent and sixty percent. Additionally, the controller circuitry 116 is configured for receiving an enable command signal from the second interface; and upon receiving the enable command signal, deactivating the output shutoff circuitry. The controller circuitry 116 is also configured to monitor the second voltage signal on the output of the voltage regulator and over-current protection circuitry 112. Upon detecting an abnormality of the second voltage signal the controller circuitry 116 is configured to activate at least a portion of the visual indicator circuitry 118 and activate the output shutoff circuitry 114.

The second interface 106 is configured to be communicatively coupled with a vehicle diagnostic device. The programming assist device 102 includes additional interconnects 120 between the first interface 104 and the second interface 106. The additional interconnects 120 facilitate scanning and programming via the OBD port of the vehicle using the vehicle diagnostic device.

The second interface 106 may be a wired interface, a wireless interface, or an optical interface. The second interface 106 may be configured to replicate the OBD port of the vehicle. In other embodiments, the second interface 106 may include a personal area network (PAN) interface. The PAN interface may be compliant to at least one version of a Bluetooth® standard. Alternately, the PAN interface may be compliant to at least one version of a Universal Serial Bus® (USB) standard.

In some embodiments, the second interface 106 may include a local area network (LAN) interface. The LAN interface may be compliant to at least one version of an Institute of Electrical and Electronics Engineers (IEEE) 802.11 standard. In other embodiments, the LAN interface may be compliant to at least one version of an IEEE 802.3 standard. In some embodiments, the second interface 106 may include a wide area network (WAN) interface. The WAN interface may be compliant to at least one version of a 2G, a 3G, a 4G, and/or a 5G Third Generation Partnership Project (3GPP) cellular standard. In certain embodiments, the controller circuitry 116 may be electrically coupled with the first interface 104. The controller circuitry 116 may receive status signals and/or provide control signals to the first interface 104. Additionally, the controller circuitry 116 may be configured to communicate over a serial interface with the vehicle via the first interface 104.

FIGS. 2-10 depict an embodiment of the programming assist device 102 of FIG. 1 in accordance with embodiments of the present disclosure.

Figure 2:
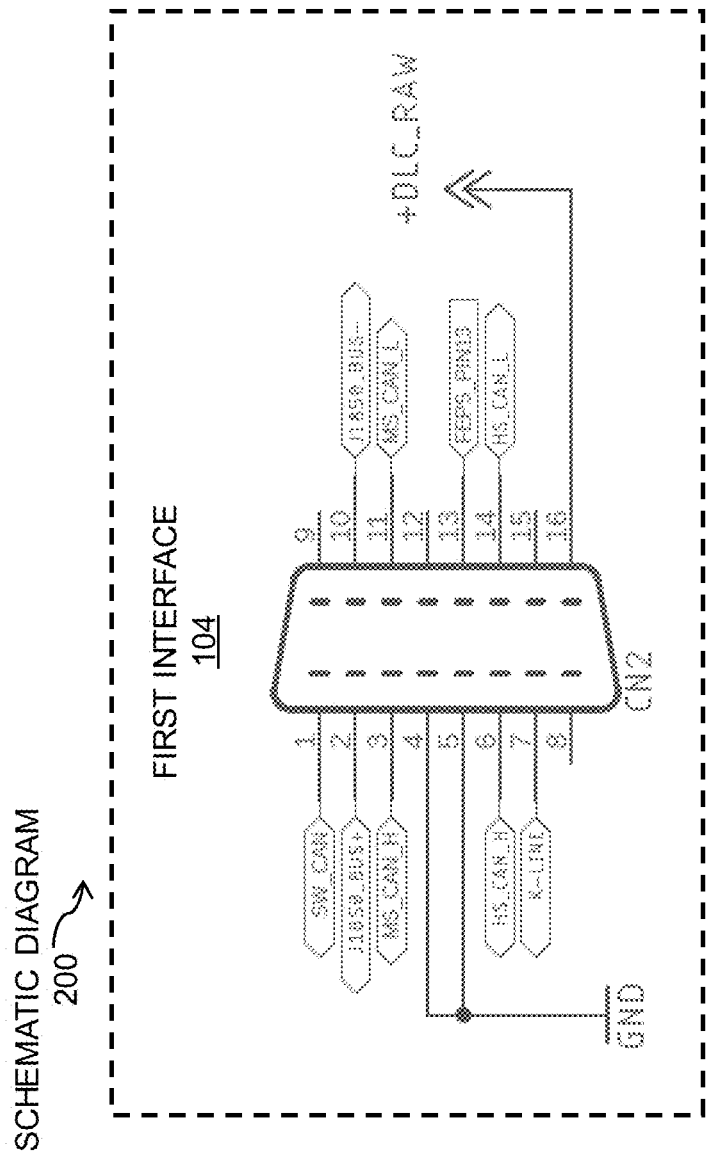
FIG. 2 depicts a schematic diagram illustrating an embodiment of the first interface of FIG. 1 in accordance with embodiments of the present disclosure.

Specifically FIG. 2 depicts a schematic diagram 200 illustrating an embodiment of the first interface 104 of FIG. 1 in accordance with embodiments of the present disclosure. A connector CN2 provides the first interface 104. Connector CN2 is a male connector and is compliant to at least one version of a Society of Automotive Engineers (SAE) J1962 standard. Pin 16 of connector CN2 is configured to provide the first voltage signal to the over-voltage protection circuitry 108. Typically, the first voltage signal is in a range of eleven to fifteen volts (DC) depending on whether a 12 volt battery of the vehicle is being charged or discharged. Pin 13 of connector CN2 is configured to provide the second voltage signal to the OBD port of the vehicle to facilitate programming.

Figure 3:
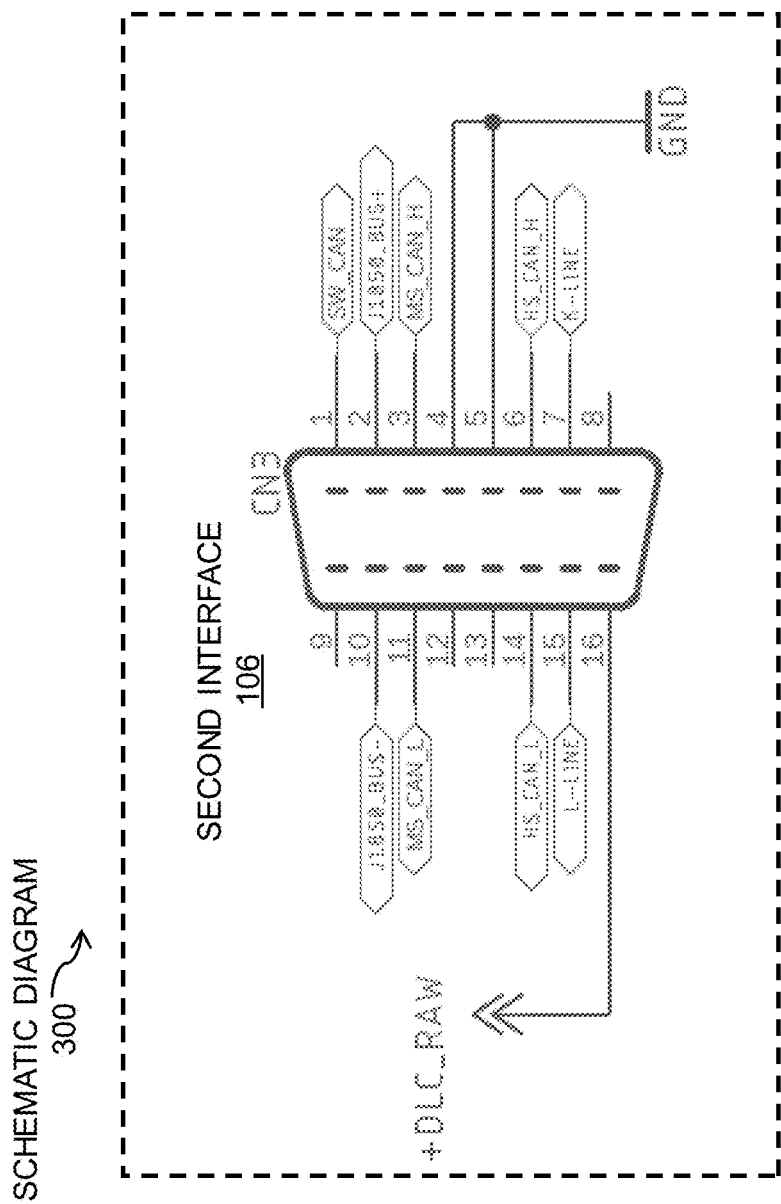
FIG. 3 depicts a schematic diagram illustrating an embodiment of the second interface of FIG. 1 in accordance with embodiments of the present disclosure.

Specifically FIG. 3 depicts a schematic diagram 300 illustrating an embodiment of the second interface 106 of FIG. 1 in accordance with embodiments of the present disclosure. A connector CN3 provides the second interface 106. Connector CN3 is a female connector and is compliant to at least one version of an SAE J1962 standard. Pins 1-3, 6-7, 10-11, and 14 of connector CN2 and connector CN3 are electrically coupled and provide the additional interconnects 120 of FIG. 1. Pins 4-5 of connector CN2 and connector CN3 are electrically coupled and are for providing ground connectivity from the vehicle. Pins 16 of connector CN2 and connector CN3 are electrically coupled and are configured to provide the first voltage signal from the OBD port of the vehicle to the vehicle diagnostic device. Pin 15 of connector CN3 is configured to receive the enable command signal from the vehicle diagnostic device.

Figure 4:
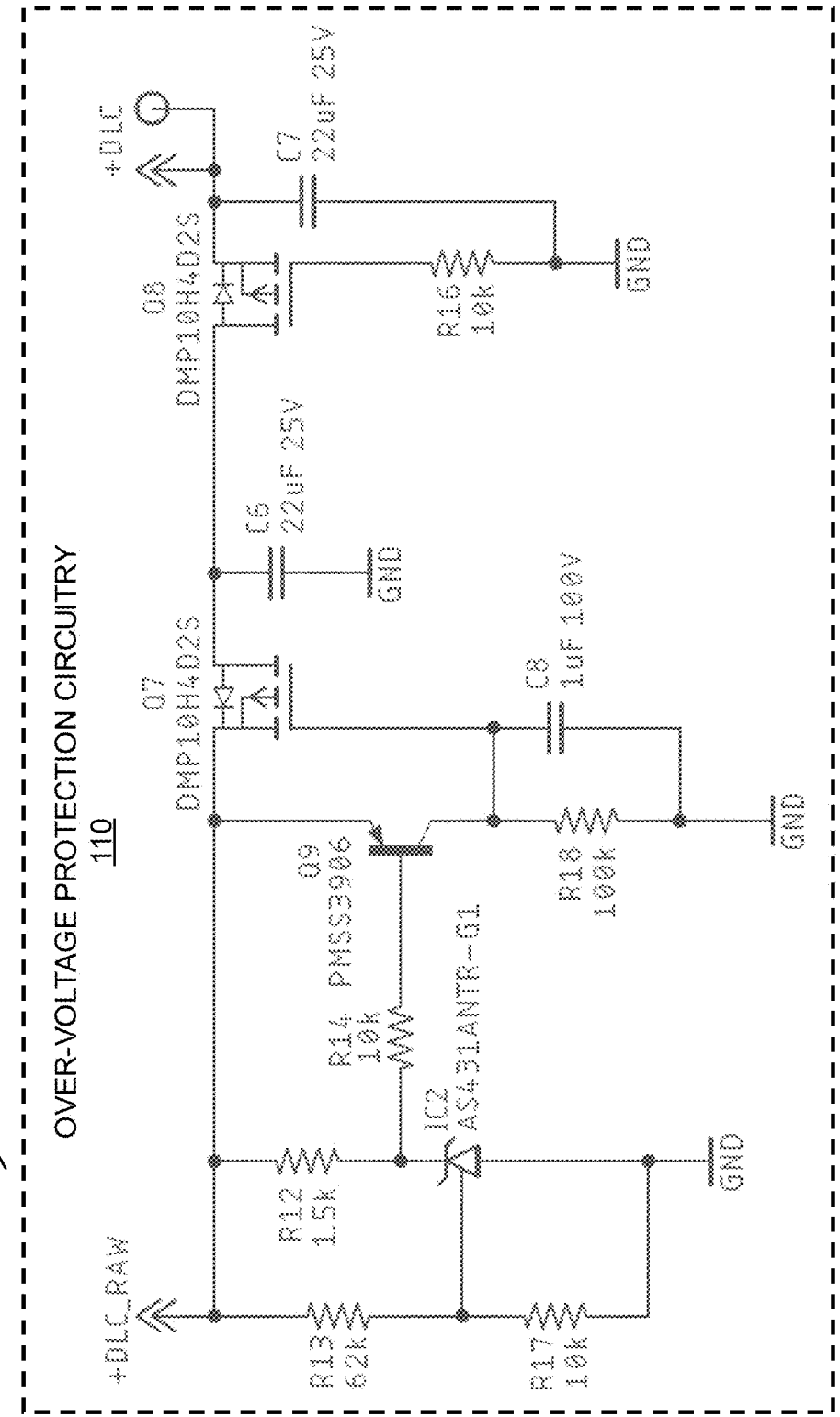
FIG. 4 depicts a schematic diagram illustrating an embodiment of the over-voltage protection circuitry of FIG. 1 in accordance with embodiments of the present disclosure.

Specifically FIG. 4 depicts a schematic diagram 400 illustrating an embodiment of the over-voltage protection circuitry 110 of FIG. 1 in accordance with embodiments of the present disclosure. Transistor Q7 and Q8 are P-channel enhancement mode metal-oxide-semiconductor field-effect transistors (MOSFETs) and are configured to prevent an overvoltage condition of the first voltage signal from damaging the power converter circuitry 110. An adjustable precision shunt regulator IC2 is configured to detect an overvoltage condition using resistor R12 and resistor R13, and then shunt current to ground. This action turns on transistor Q9 which then turns off transistor Q7.

Figure 5:
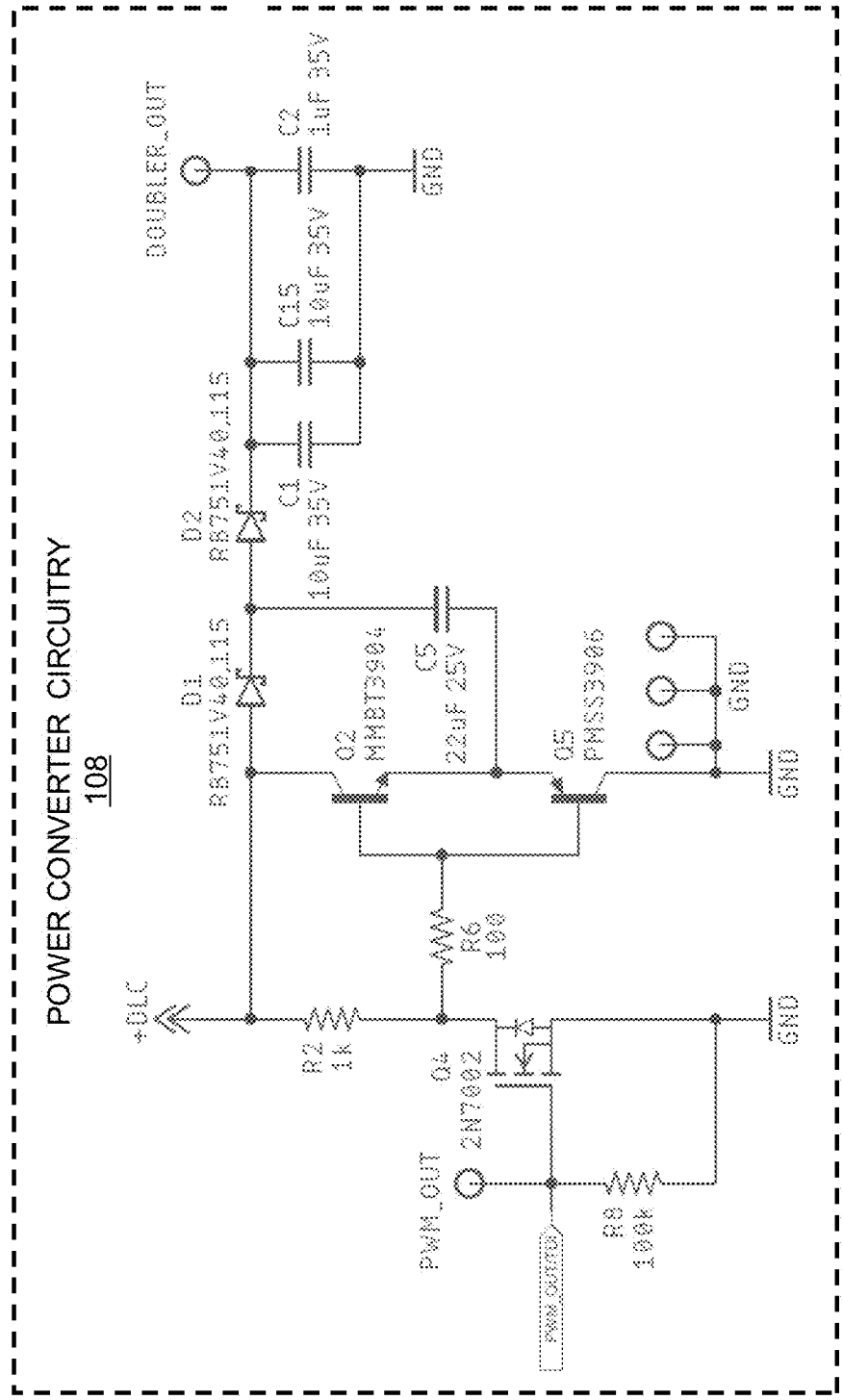
FIG. 5 depicts a schematic diagram illustrating an embodiment of the power converter circuitry of FIG. 1 in accordance with embodiments of the present disclosure.

Specifically FIG. 5 depicts a schematic diagram 500 illustrating an embodiment of the power converter circuitry 108 of FIG. 1 in accordance with embodiments of the present disclosure. As depicted, the power converter circuitry 108 is configured as a voltage doubling converter and more specifically as a charge pump direct current (DC) to DC converter.

At start up, the switched signal is a logic low signal, transistor Q4 and transistor Q5 are off. In this state transistor Q2 is on and applies the first voltage signal to capacitor C5. During this state Schottky diode D1 and Schottky diode D2 are forward biased and provide charging of capacitors C1, C2, and C15 from the first voltage signal.

When the switched signal transitions to a logic high signal, transistor Q4 and transistor Q5 are on. In this state transistor Q2 is off and transistor Q5 applies ground to capacitor C5. During this state Schottky diode D1 remains forward biased and provides charging to capacitor C5. Schottky diode D2 is reversed biased in this state to prevent discharging of capacitors C1, C2, and C15.

When the switched signal transitions back to a logic low signal, transistor Q4 and transistor Q5 are off. In this state transistor Q2 is on and the previous charge voltage of capacitor C5 is added to the first voltage signal and charges capacitors C1, C2, and C15 via Schottky diode D2 to a voltage level greater than the first voltage signal to create the second voltage signal. Over several cycles of the switched signal the voltage across capacitors C1, C2, and C15 (i.e., the second voltage signal) is nearly double the voltage of the first voltage signal.

Figure 6:
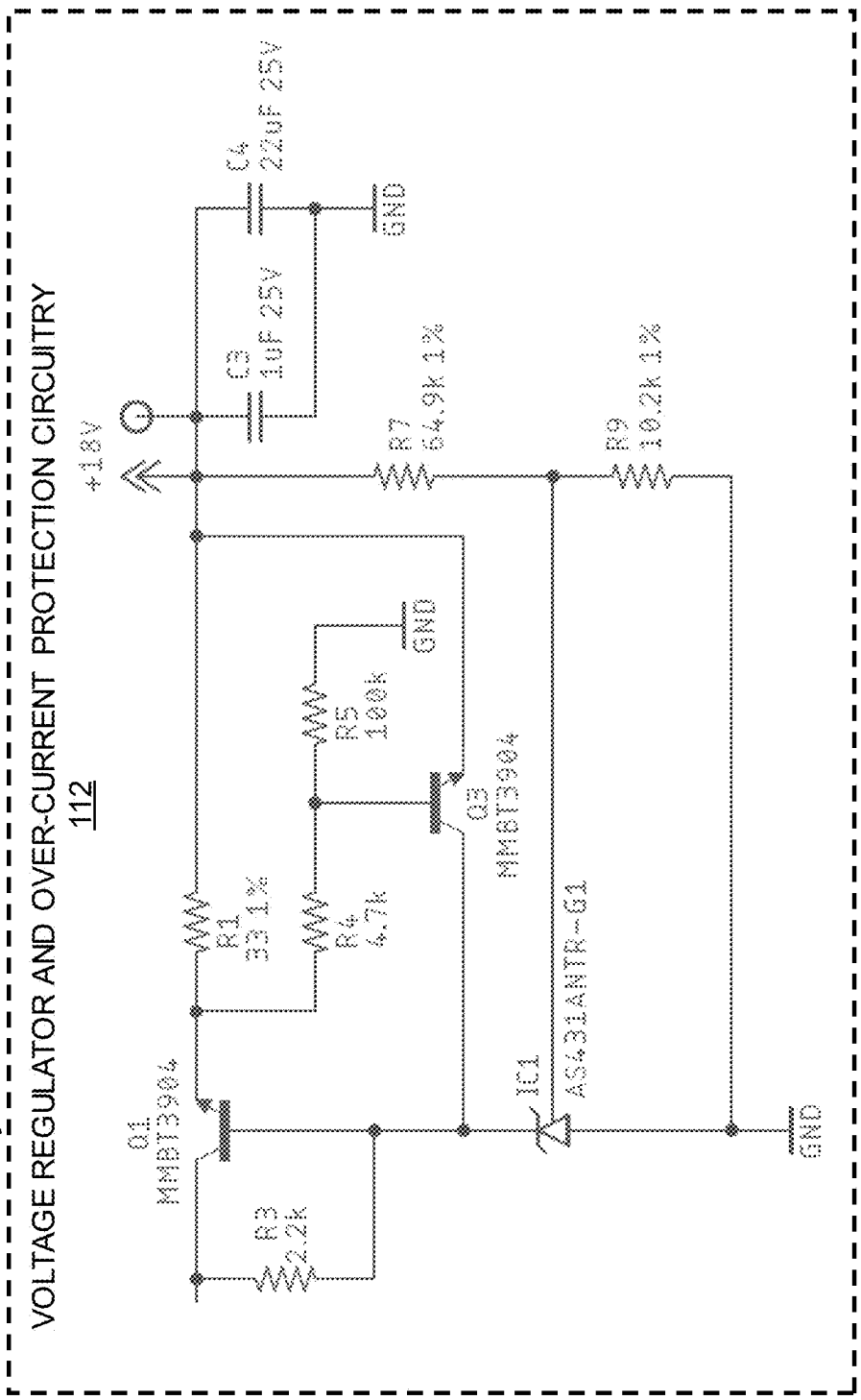
FIG. 6 depicts a schematic diagram illustrating an embodiment of the voltage regulator and over-current protection circuitry of FIG. 1 in accordance with embodiments of the present disclosure.

Specifically FIG. 6 depicts a schematic diagram 600 illustrating an embodiment of the voltage regulator and over-current protection circuitry 112 of FIG. 1 in accordance with embodiments of the present disclosure. Transistor Q1 and adjustable precision shunt regulator IC1 regulate the second voltage signal to approximately 18 volts DC. Transistor Q3 is configured to detect an over current condition and turn off Q1 to protect the power converter circuitry 110. The voltage regulator and over-current protection circuitry 112 receives unregulated voltage from the power converter circuitry 108 of FIG. 5 (i.e., a capacitive voltage doubler) and regulates its output voltage to the output shutoff circuitry of FIG. 7 to approximately 18 volts while providing over-current protection.

Figure 7:
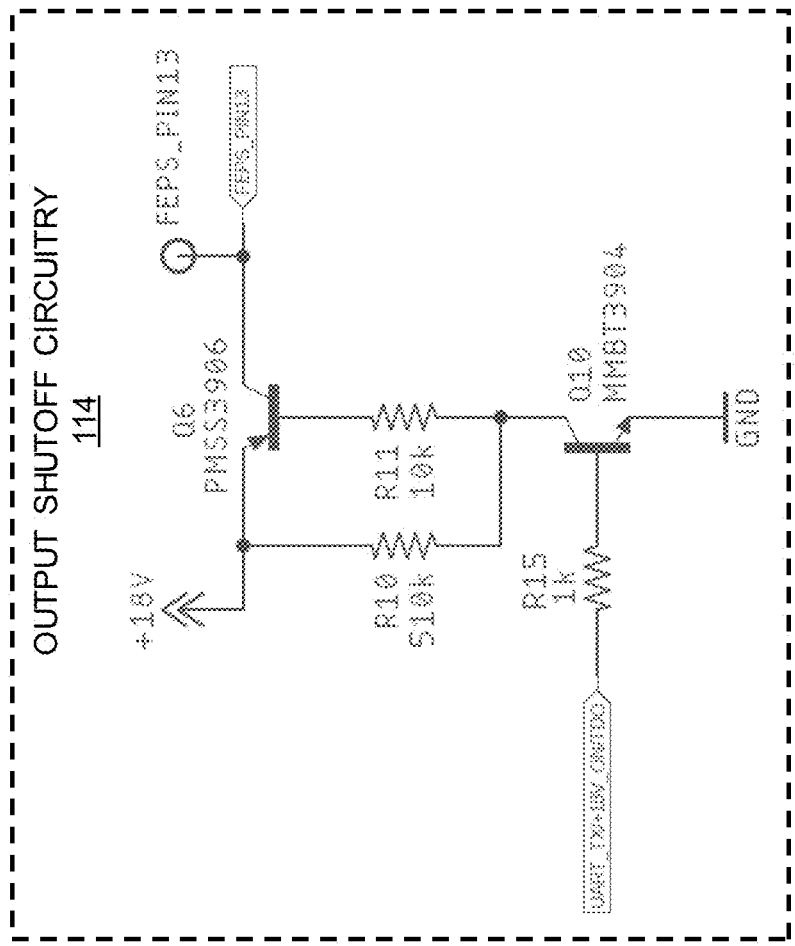
FIG. 7 depicts a schematic diagram illustrating an embodiment of the output shutoff circuitry of FIG. 1 in accordance with embodiments of the present disclosure.

Specifically FIG. 7 depicts a schematic diagram 700 illustrating an embodiment of the output shutoff circuitry 114 of FIG. 1 in accordance with embodiments of the present disclosure. The controller circuitry 116 is configured to turn off transistor Q10 which turns off transistor Q6 to remove the second voltage signal from the first interface 104.

Figure 8:
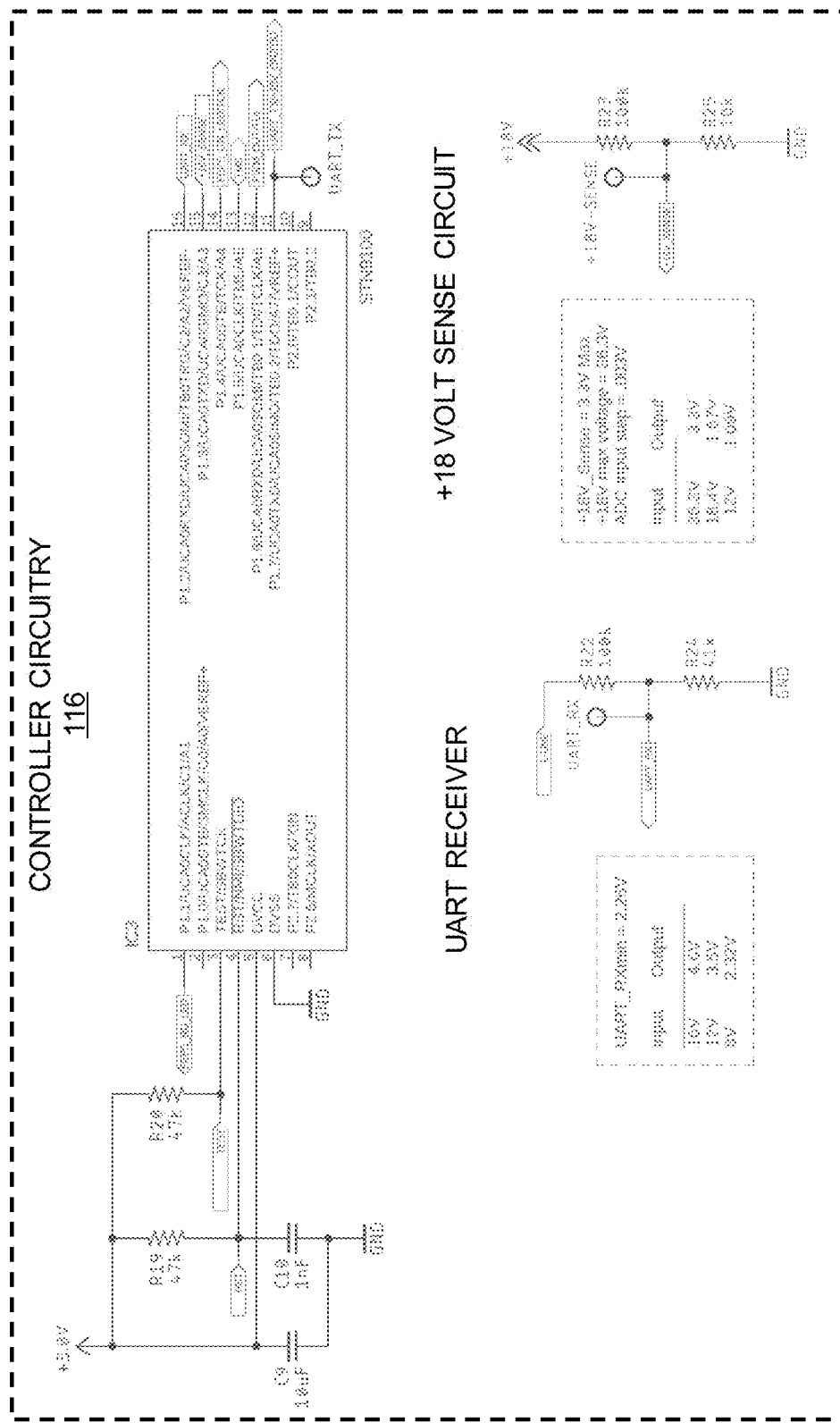
FIG. 8 depicts a schematic diagram illustrating an embodiment of the controller circuitry of FIG. 1 in accordance with embodiments of the present disclosure.

Specifically FIG. 8 depicts a schematic diagram 800 illustrating an embodiment of the controller circuitry 116 of FIG. 1 in accordance with embodiments of the present disclosure. A microcontroller IC3 is a Texas Instruments (TI) MSP430 microcontroller and configured to provide the functionality as described with FIG. 1. In this preferred embodiment the switched signal has a fixed duty cycle of approximately fifty percent and with frequency of approximately 32 kilo-Hertz (kHz). Additionally, the controller circuitry 116 is configured to monitor second voltage signal at the output of the voltage regulator and over-current protection circuitry 112 using resistors R23 and R25.

Figure 9:
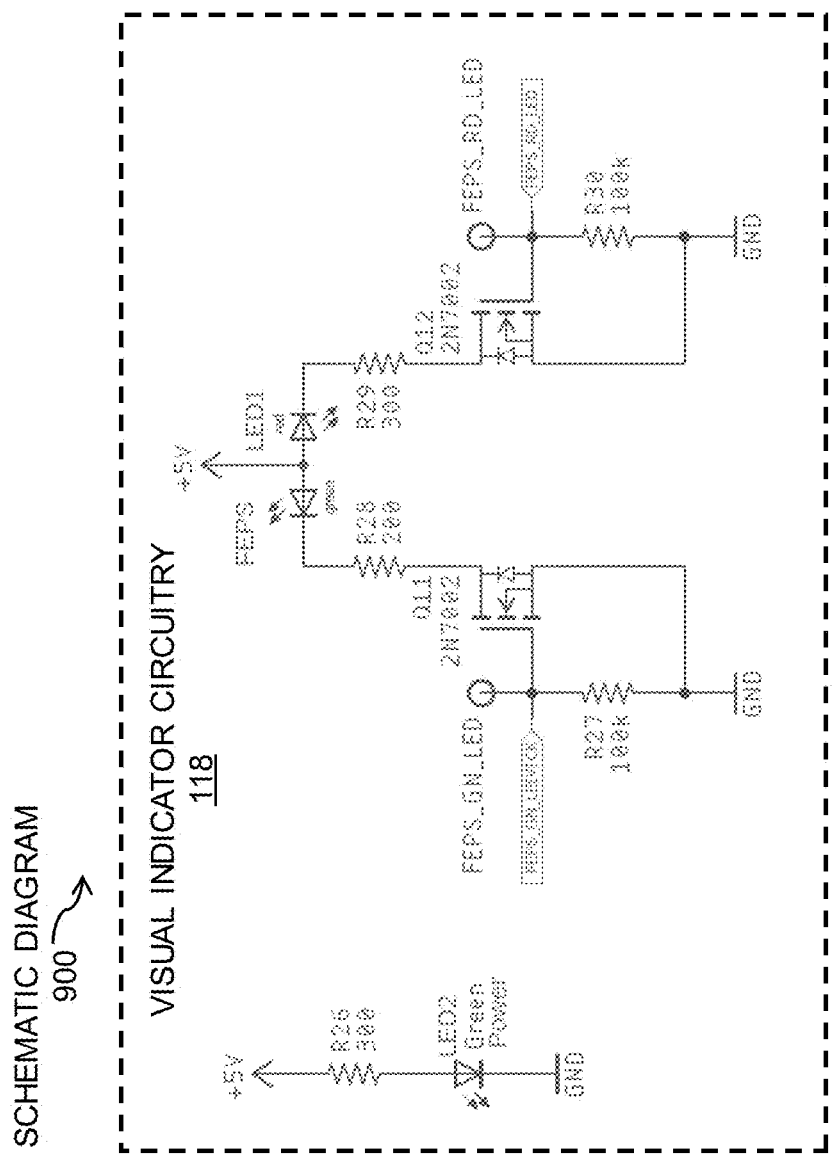
FIG. 9 depicts a schematic diagram illustrating an embodiment of the visual indicator circuitry of FIG. 1 in accordance with embodiments of the present disclosure.

Specifically FIG. 9 depicts a schematic diagram 900 illustrating an embodiment of the visual indicator circuitry 118 of FIG. 1 in accordance with embodiments of the present disclosure. A first indicator LED2 is a green light-emitting-diode (LED) and is configured to indicate that power is being received via the first voltage signal from the first interface 104. The first indicator LED2 is not under control of the controller circuitry 116. A second indicator Flash EEPROM Programming Signal (FEPS) is a green LED and is configured to indicate that the second voltage source is being applied to the first interface 104 to facilitate programing of the vehicle. A third indicator LED1 is a red LED and is configured to indicate a fault condition of the programming assist device 102.

When the programming assist device 102 is plugged into the OBD port of the vehicle the first indicator LED2 becomes active. The controller circuitry 116 begins providing the switched signal to the power converter circuitry 110. The switched signal remains active as long as the first voltage signal is present at the first interface 104. The controller circuitry 116 then begins monitoring the second voltage signal at the output of the voltage regulator and over-current protection circuitry 112. If the measured voltage is greater than approximately 19 volts DC, the controller circuitry 116 activates the third indicator LED1 to a solid ON state. If the measured voltage is less than approximately 17 volts DC, the controller circuitry 116 activates the third indicator LED1 to a blinking state of approximately 50 milliseconds (ms) ON and 50 ms OFF. During either an overvoltage condition or an undervoltage condition, the controller circuitry 116 will keep the output shutoff circuitry 114 active regardless if an enable command signal has been received via the second interface 106 from the vehicle diagnostic device.

When the controller circuitry 116 receives an enable command signal (typically two bytes), the controller circuitry 116 deactivates the output shutoff circuitry 114 if the second voltage signal is determined to be between approximately 17 and 19 volts DC. Additionally, the controller circuitry activates the second indicator FEPS. While the second voltage signal is applied to the first interface the vehicle diagnostic device can program the vehicle.

When the controller circuitry 116 receives a disable command signal (typically two bytes), the controller circuitry 116 activates the output shutoff circuitry 114 to remove the second voltage signal from the first interface 104. Additionally, the controller circuitry deactivates second indicator FEPS.

Figure 10:
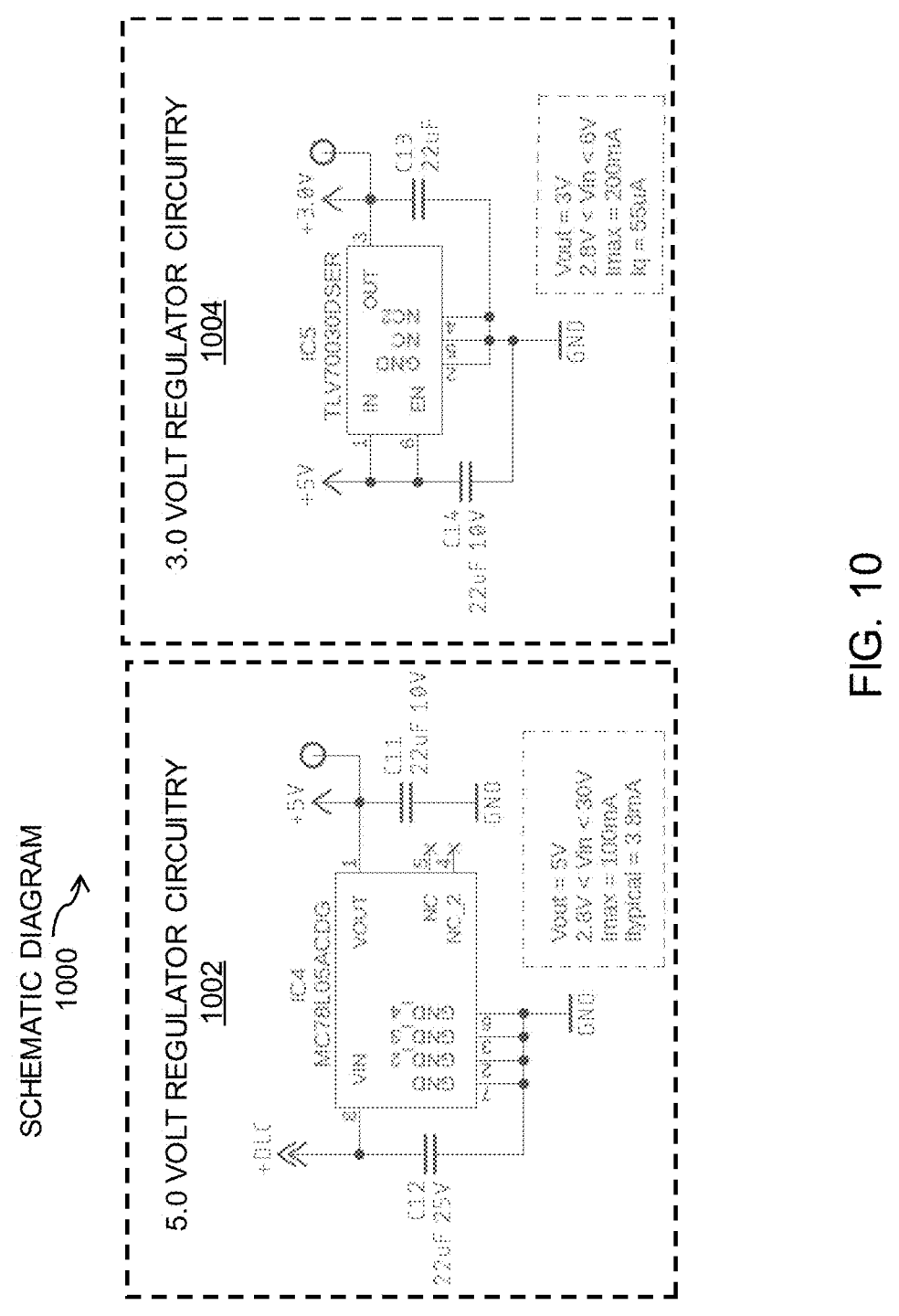

Specifically FIG. 10 depicts a schematic diagram 1000 illustrating 5.0 volt regulator circuitry 1002 and 3.0 volt regulator circuitry 1004 (not shown in FIG. 1) in accordance with embodiments of the present disclosure. A voltage regulator IC4 is configured to receive the first voltage signal from the output of the over-voltage protection circuitry 110 and provide a 5.0 volt DC signal to the 3.0 volt regulator circuitry 1004 and the visual indicator circuitry 118. The voltage regulator IC5 is configured to provide a 3.0 volt DC signal to the controller circuitry 116.

Figure 11:
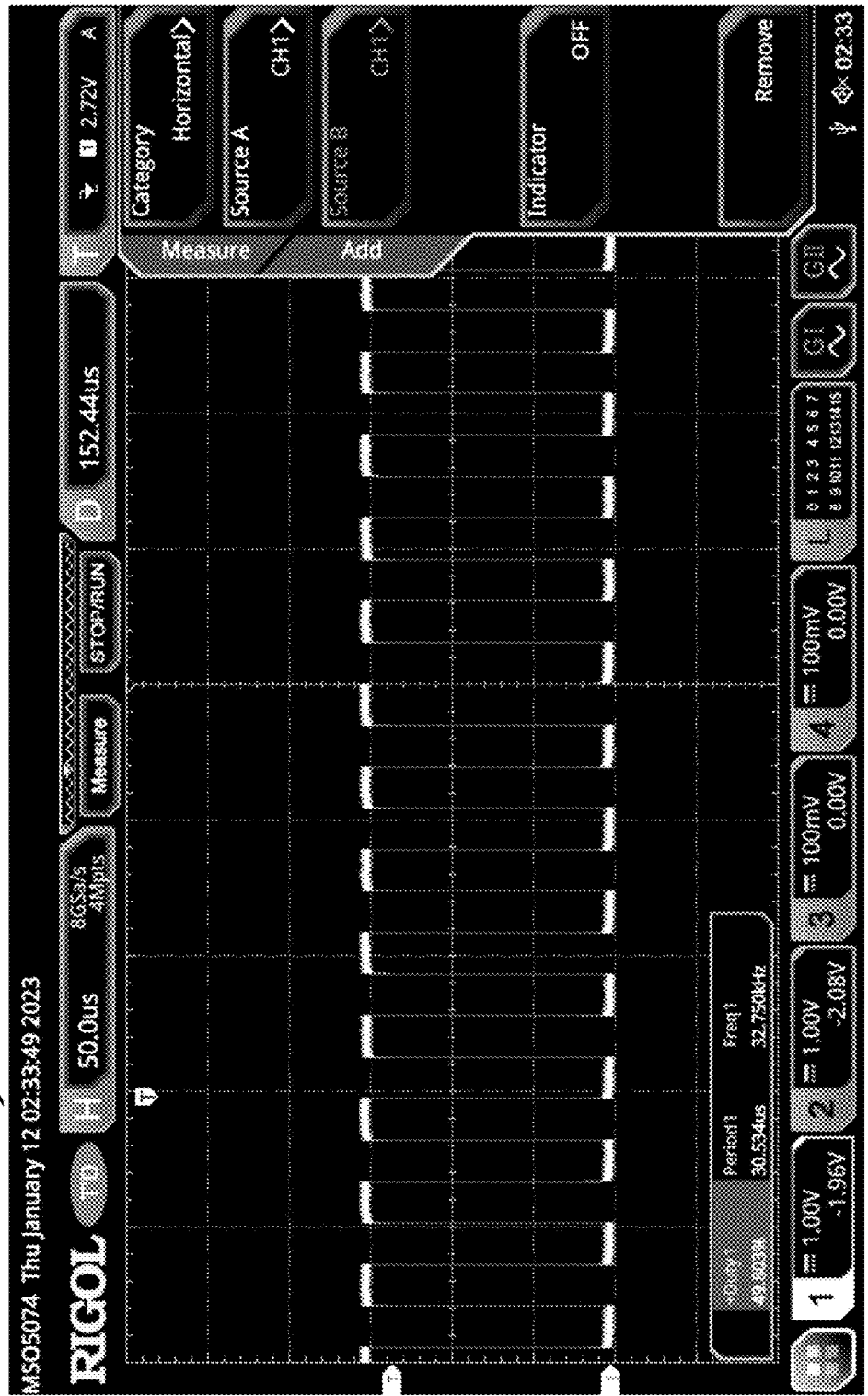
FIG. 11 depicts an oscilloscope diagram illustrating a waveform from the power converter circuitry of FIG. 5 in accordance with embodiments of the present disclosure.

FIG. 11 depicts an oscilloscope diagram 1100 illustrating a waveform (i.e., the switched signal) recorded at the gate of the transistor Q4 of the power converter circuitry 110 of FIG. 5 in accordance with embodiments of the present disclosure. The switched signal is provided as long as the first voltage signal is being received from the first interface 104. The duty cycle of the switched signal is approximately 50% and has a frequency of approximately 32.75 kHz. The switched voltage is approximately zero volts when low and 3.0 volts when high.

Figure 12:
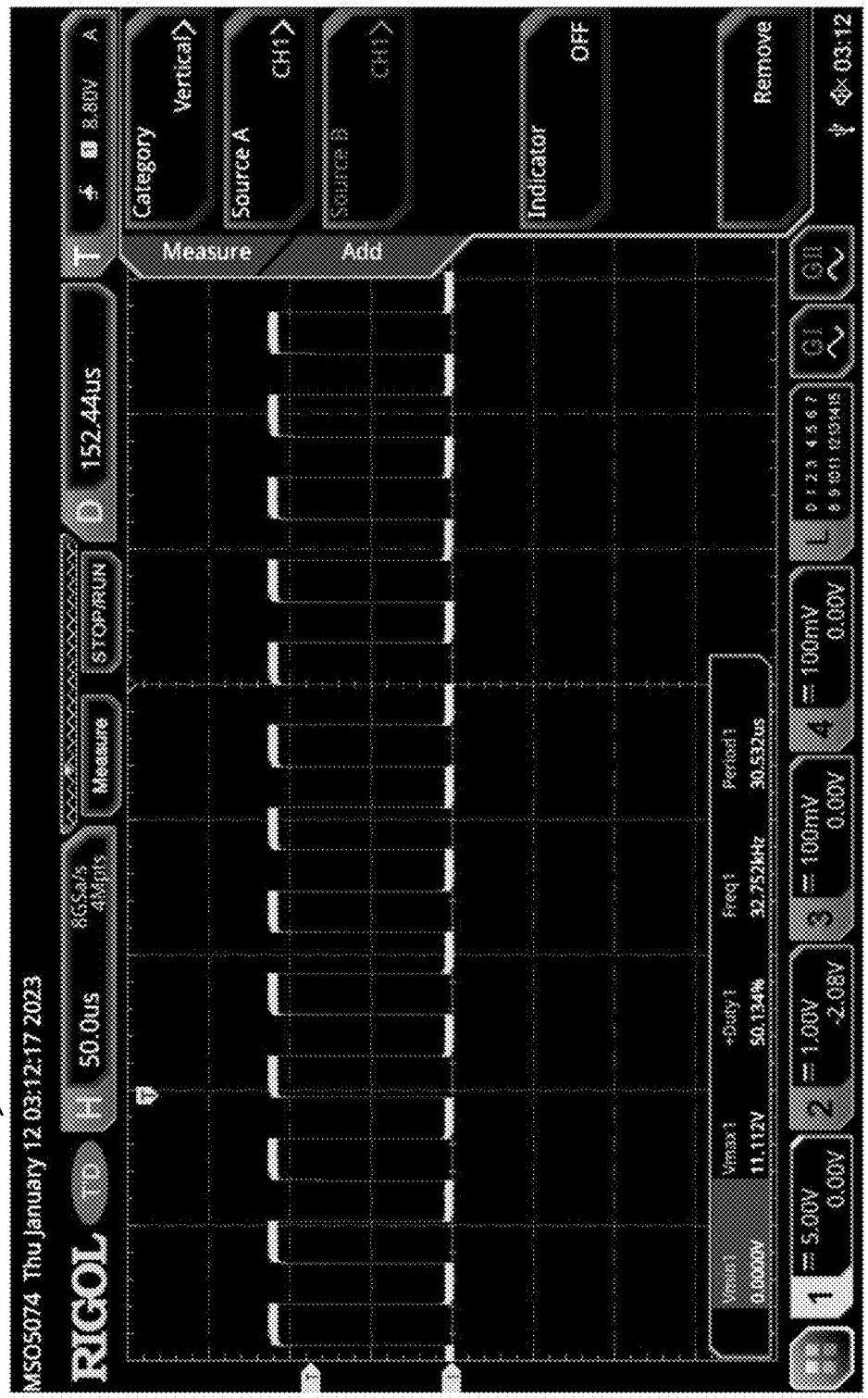
FIG. 12 depicts an oscilloscope diagram illustrating another waveform from the power converter circuitry of FIG. 5 in accordance with embodiments of the present disclosure.
Figure 12:
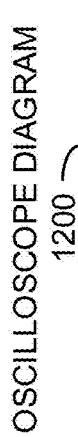

FIG. 12 depicts an oscilloscope diagram 1200 illustrating a waveform recorded at the drain of transistor Q4 of the power converter circuitry 110 of FIG. 5 in accordance with embodiments of the present disclosure.

Figure 13:
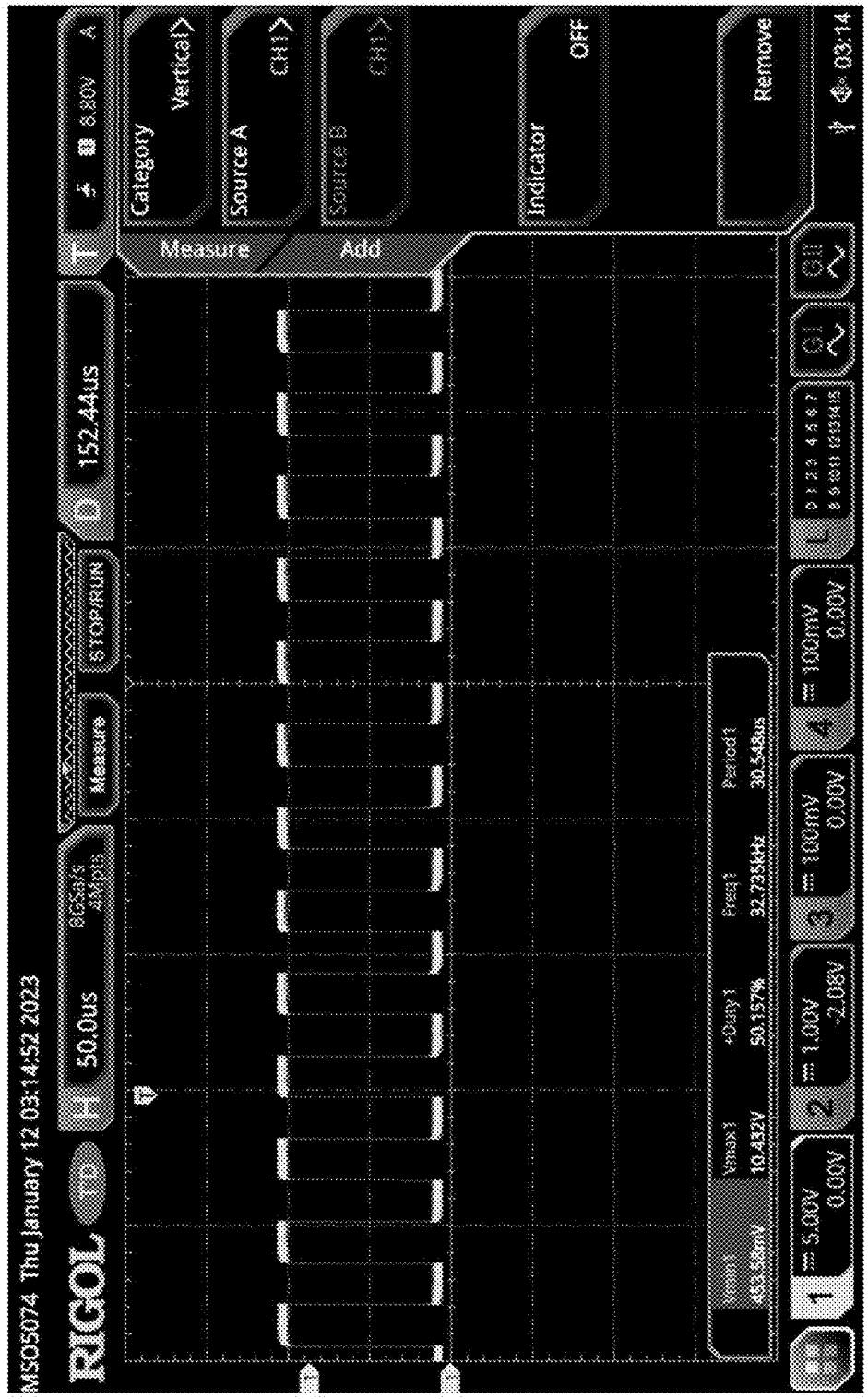
FIG. 13 depicts an oscilloscope diagram illustrating still another waveform from the power converter circuitry of FIG. 5 in accordance with embodiments of the present disclosure.

FIG. 13 depicts an oscilloscope diagram 1300 illustrating a waveform recorded at the emitter of Q2 and the emitter of Q5 of the power converter circuitry 110 of FIG. 5 in accordance with embodiments of the present disclosure.

Figure 14:
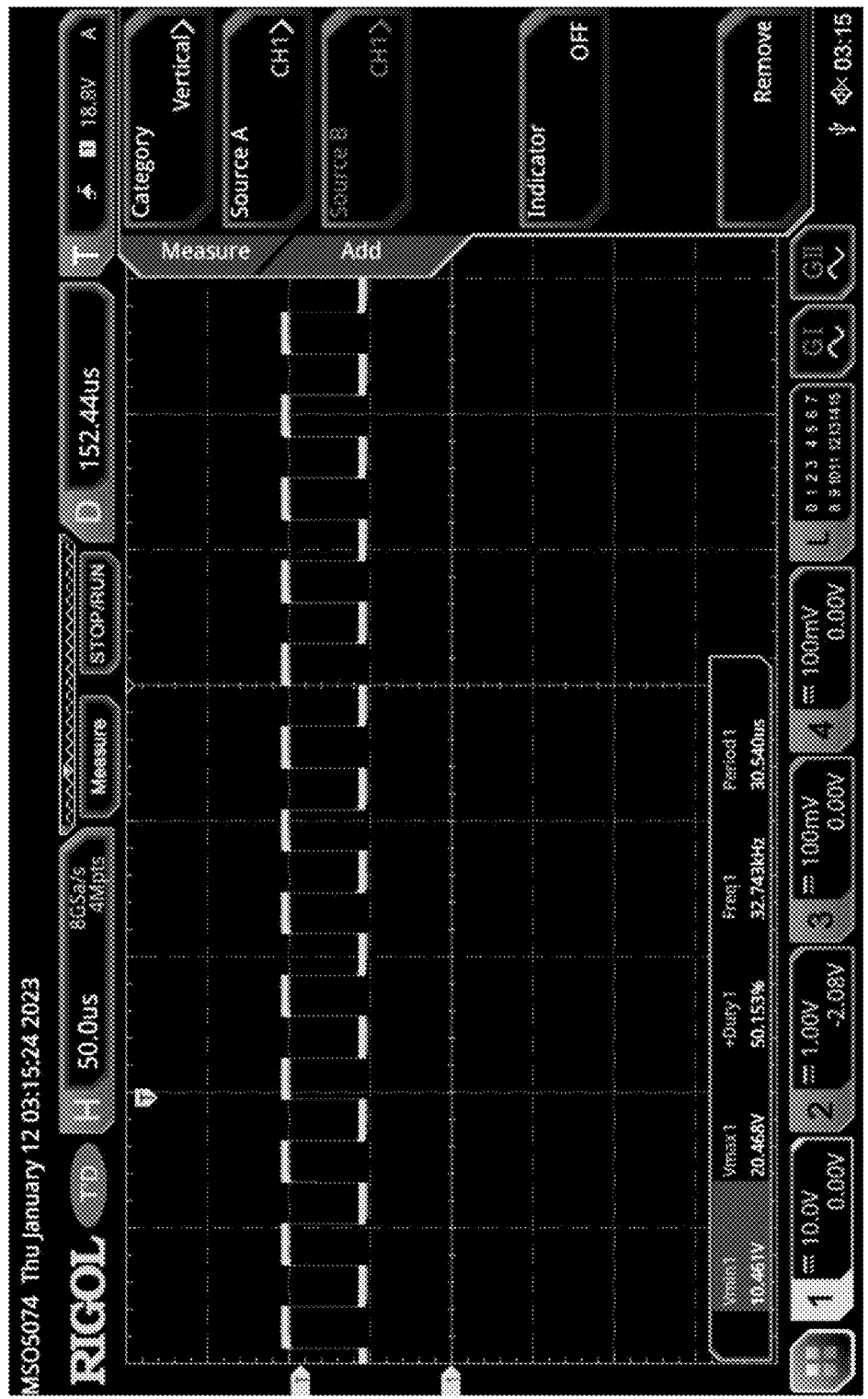
FIG. 14 depicts an oscilloscope diagram illustrating still another waveform from the power converter circuitry of FIG. 5 in accordance with embodiments of the present disclosure.
Figure 14:

FIG. 14 depicts an oscilloscope diagram 1400 illustrating a waveform recorded at the cathode of Schottky diode D1 and the anode of Schottky diode D2 of the power converter circuitry 110 of FIG. 5 in accordance with embodiments of the present disclosure.

Figure 15:
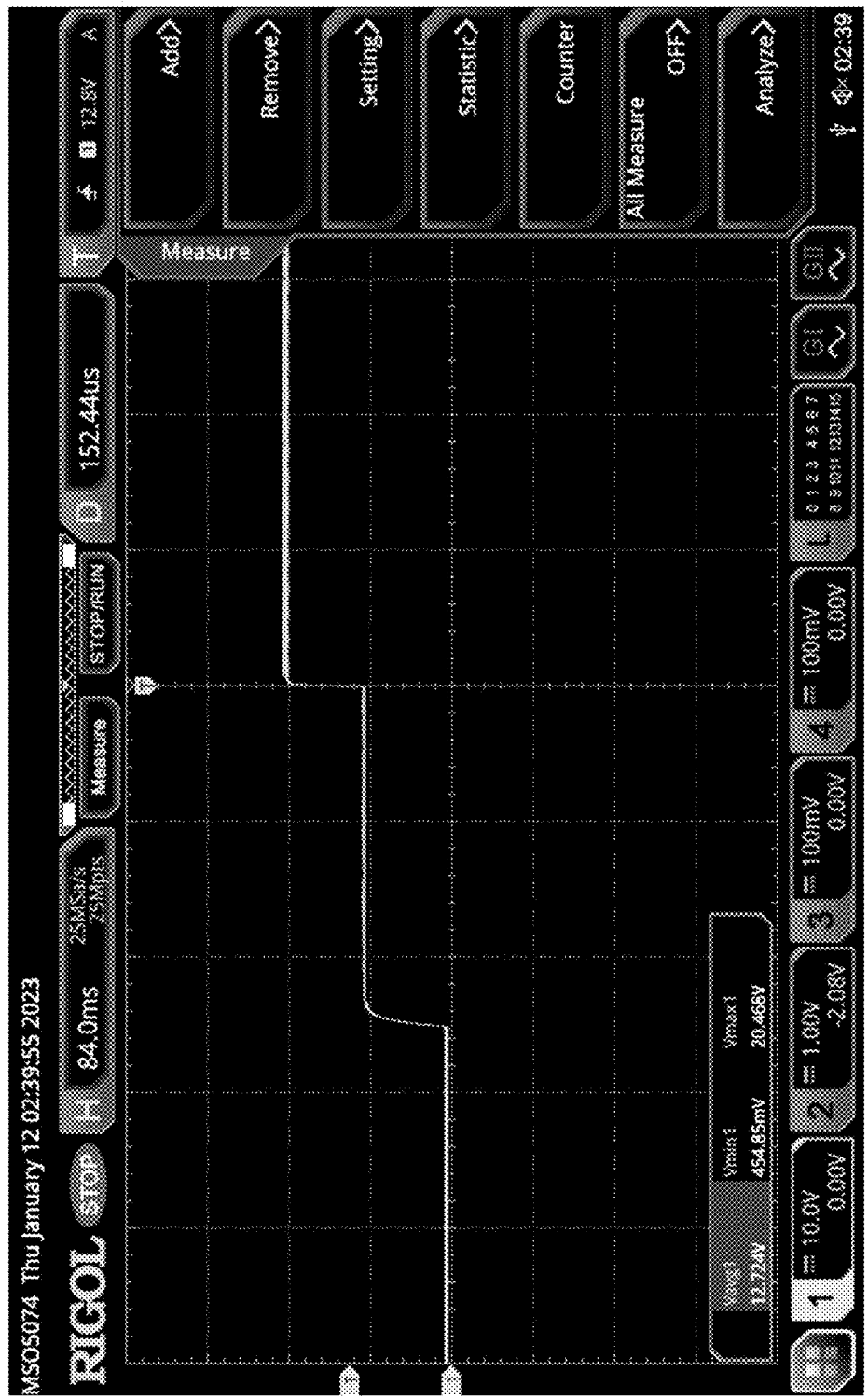
FIG. 15 depicts an oscilloscope diagram illustrating still another waveform from an the output of the power converter circuitry of FIG. 5 in accordance with embodiments of the present disclosure.

FIG. 15 depicts an oscilloscope diagram 1500 illustrating a waveform recorded at the output of the power converter circuitry 110 (i.e. the cathode of Schottky diode D2) of FIG. 5 in accordance with embodiments of the present disclosure. As previously described with FIG. 5, as the power converter circuitry 110 begins operation the voltage increases to approximately the first voltage signal and then doubles in value to provide the second voltage signal.

Figure 16:
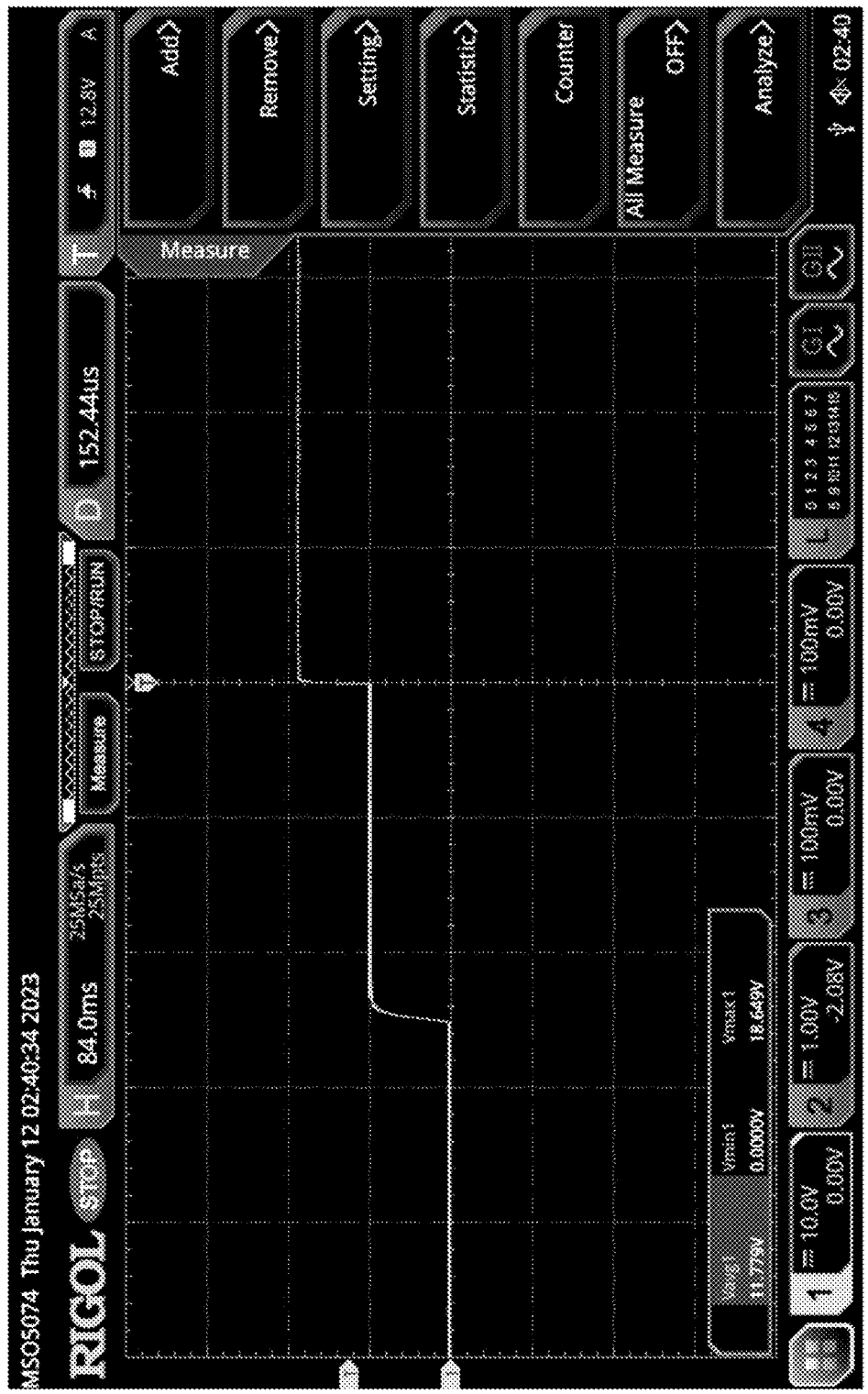
FIG. 16 depicts an oscilloscope diagram 1600 illustrating a waveform recorded at the output of the of the voltage regulator and over-current protection circuitry 112 of FIG. 6 in accordance with embodiments of the present disclosure.

FIG. 16 depicts an oscilloscope diagram 1600 illustrating a waveform recorded at the output of the of the voltage regulator and over-current protection circuitry 112 of FIG. 6 in accordance with embodiments of the present disclosure.

Figure 17:
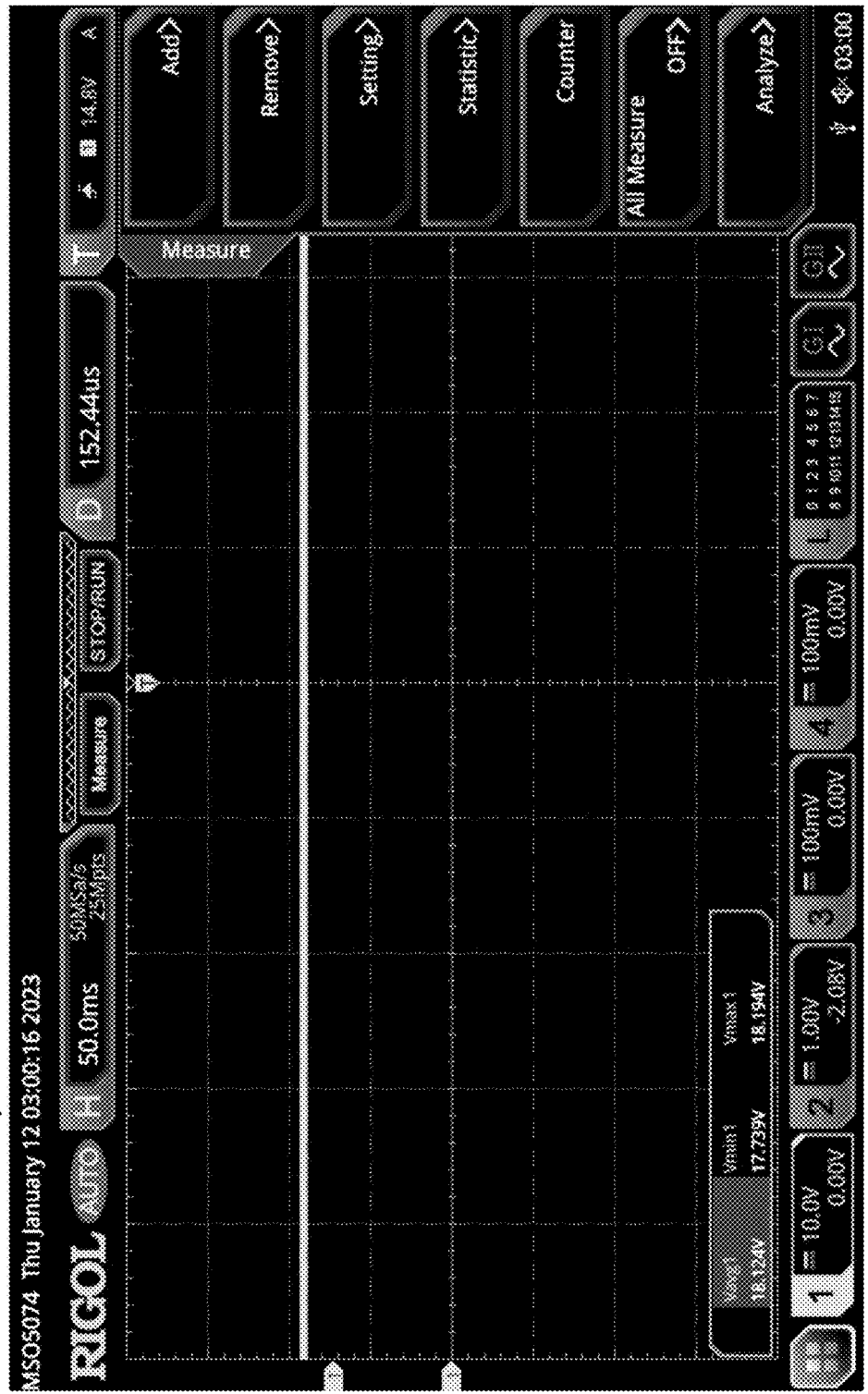
FIG. 17 depicts an oscilloscope diagram 1700 illustrating a waveform (i.e., the second voltage signal) recorded at pin 13 of connector CN2 of the second interface 104 of FIG. 2 in accordance with embodiments of the present disclosure.

FIG. 17 depicts an oscilloscope diagram 1700 illustrating a waveform (i.e., the second voltage signal) recorded at pin 13 of connector CN2 of the second interface 104 of FIG. 2 in accordance with embodiments of the present disclosure. The second voltage signal is approximately 18.127 volts DC and facilitates programing of the vehicle using the vehicle diagnostic device.

Figure 18:
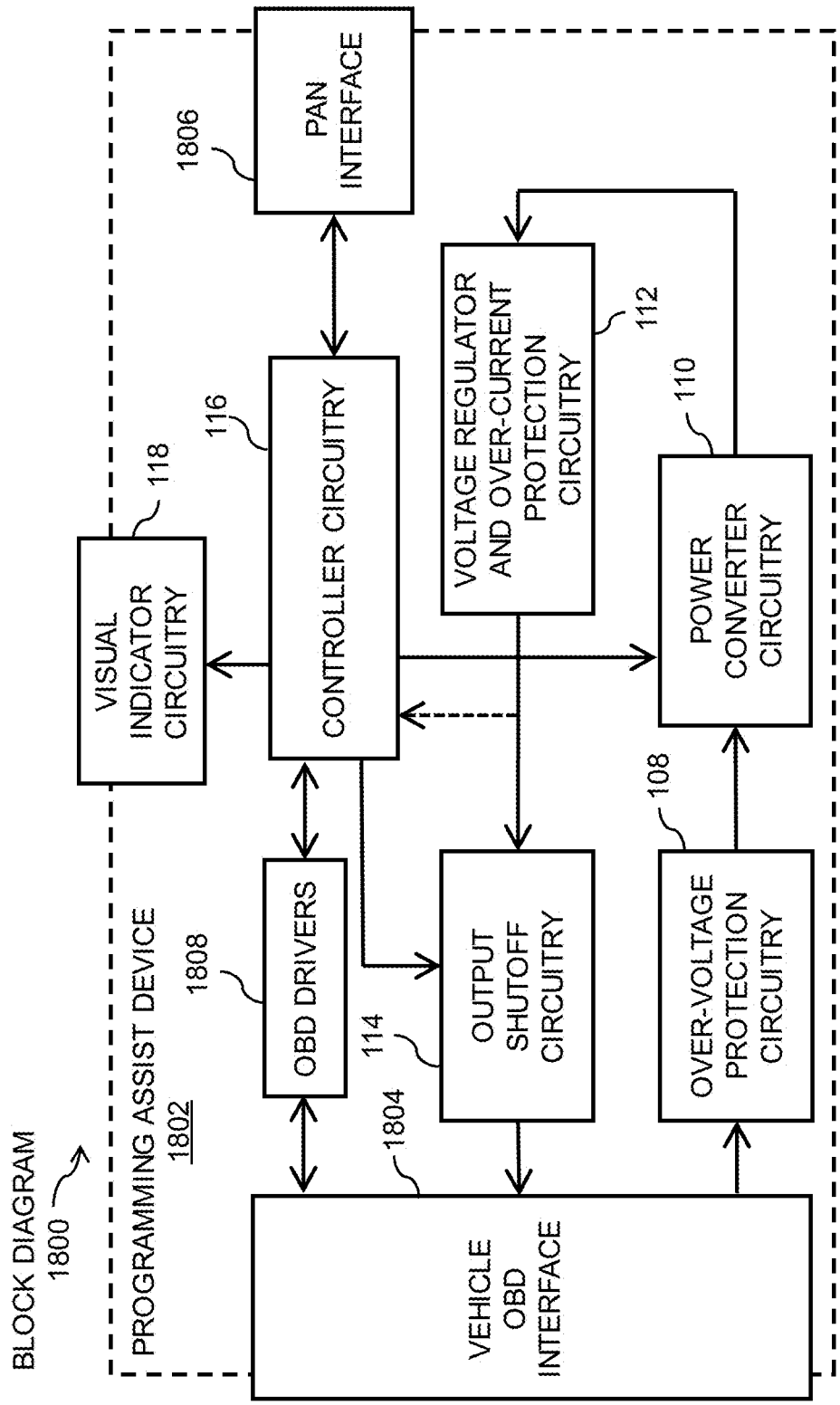
FIG. 18 depicts a block diagram illustrating another embodiment of a programming assist device having a wireless interface in place of the second interface of FIG. 1 in accordance with embodiments of the present disclosure.

FIG. 18 depicts a block diagram 1800 illustrating another embodiment of a programming assist device 1802 in accordance with embodiments of the present disclosure. The programming assist device 1802 includes the over-voltage protection circuitry 108, the power converter circuitry 110, the voltage regulator and over-current protection circuitry 112, the output shutoff circuitry 114, the controller circuitry 116, and the visual indicator circuitry 118 of FIG. 1. A vehicle OBD interface 1804 replaces the first interface 104 of FIG. 1 and a PAN interface 1806 replaces the second interface 106 of FIG. 1. Additionally, OBD drivers 1808 are electrically coupled between the vehicle OBD interface 1804 and the controller circuitry 116. The vehicle OBD interface 1804 may be compliant to at least one version of an SAE J1962 standard. The PAN interface 1806 may be compliant to at least one version of a USB® standard or a Bluetooth® standard. The PAN interface 1806 is configured to be communicatively coupled with an external computing device executing a vehicle diagnostic application to provide a vehicle diagnostic device (not shown in FIG. 18). The external computing device may be a smart phone, a smart tablet, a smart watch, a personal computer, a laptop, or the like. The OBD drivers 1808 provide the functionality of the additional interconnects 120 of FIG. 1 to facilitate scanning and programming via the OBD port of the vehicle using the vehicle diagnostic device.

Figure 19:
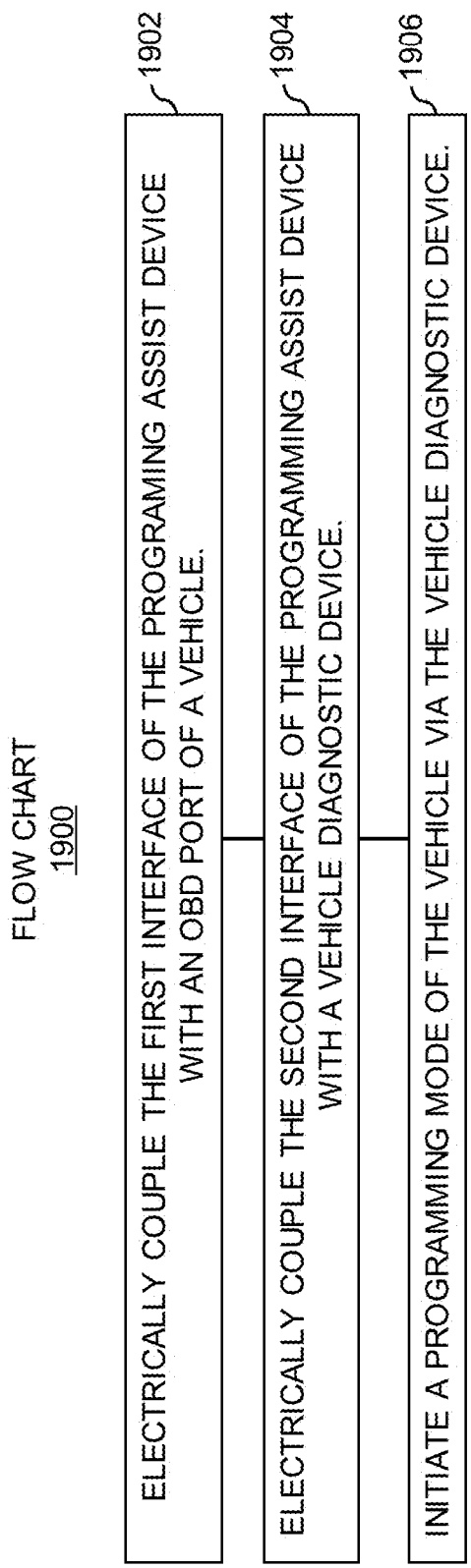
FIG. 19 depicts a flowchart illustrating a method for using the programming assist device of FIG. 1 with a vehicle diagnostic device in accordance with embodiments of the present disclosure.

FIG. 19 depicts a flowchart 1900 illustrating a method of operating the programming assist device 102 of FIG. 1 in accordance with embodiments of the present disclosure.

In step 1902, the method includes electrically coupling the first interface 104 of the programing assist device 102 with an OBD port of a vehicle.

In step 1904, the method further includes electrically coupling the second interface 104 of the programming assist device 102 with a vehicle diagnostic device.

In step 1906, the method further includes initiating a programming mode of the vehicle via the vehicle diagnostic device.

Figure 20:
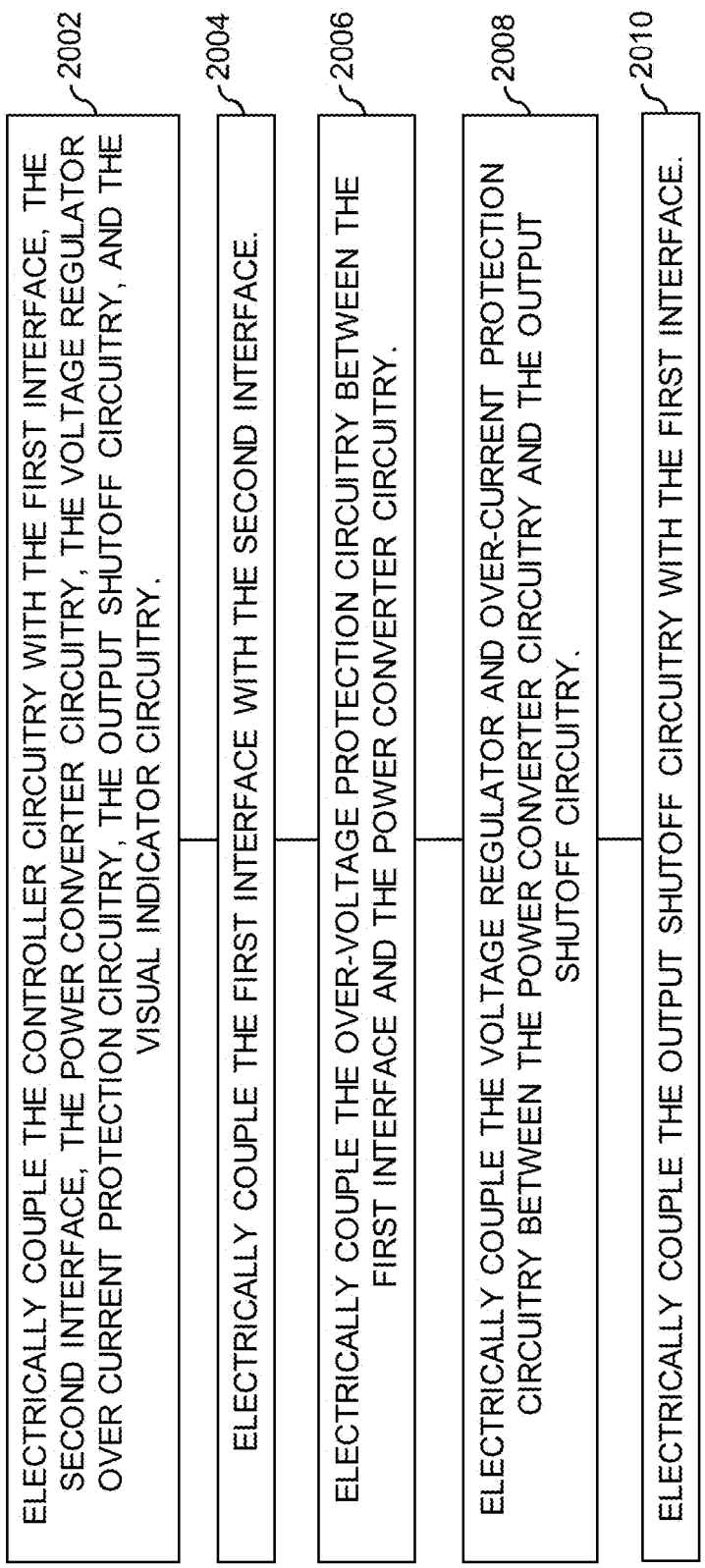
FIG. 20 depicts a flowchart illustrating a method of assembling the programing assist device of FIG. 1 in accordance with embodiments of the present disclosure.

FIG. 20 depicts a flowchart 2000 illustrating a method of assembling the programming assist device 102 of FIG. 1 in accordance with embodiments of the present disclosure.

In step 2002, the method includes electrically coupling the controller circuitry 116 with the first interface 104, the second interface 106, the power converter circuitry 110, the voltage regulator over current protection circuitry 112, the output shutoff circuitry 114, and the visual indicator circuitry 118.

In step 2004, the method further includes further electrically coupling the first interface 104 with the second interface 106.

In step 2006, the method further includes electrically coupling the over-voltage protection circuitry 108 between the first interface 104 and the power converter circuitry 110.

In step 2008, the method further includes electrically coupling the voltage regulator and over-current protection circuitry 112 between the power converter circuitry 110 and the output shutoff circuitry 114.

In step 2010, the method further includes further electrically coupling the output shutoff circuitry 114 with the first interface 104.

In steps 2002 through 2010, the electrical coupling may be provided by a printed circuit board (PCB).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C #, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A programming assist device comprising:
a first interface configured to be electrically coupled with an on-board diagnostics (OBD) port of a vehicle;
power converter circuitry configured for:
receiving a first voltage signal from a first pin of the first interface; and
providing a second voltage signal to a second pin of the first interface, wherein the second voltage signal is configured to facilitate a programming mode for the vehicle;
and
a second interface configured to be communicatively coupled with a vehicle diagnostic device.

2. The programming assist device of claim 1 further comprising over-voltage protection circuitry electrically coupled between the first pin of the first interface and the power converter circuitry.

3. The programming assist device of claim 2 further comprising voltage regulator and over-current protection circuitry electrically coupled between the power converter circuitry and the second pin of the first interface.

4. The programming assist device of claim 3 further comprising output shutoff circuitry electrically coupled between the voltage regulator and over-current protection circuitry and the second pin of the first interface.

5. The programming assist device of claim 4 further comprising controller circuitry configured for:
providing a switched signal to the power converter circuitry;
receiving an enable command signal from the second interface; and
upon receiving the enable command signal, deactivating the output shutoff circuitry.

6. The programming assist device of claim 5, wherein the switched signal has a fixed duty cycle between forty percent and sixty percent.

7. The programming assist device of claim 5, wherein the switched signal has a fixed duty cycle of approximately fifty percent.

8. The programming assist device of claim 5, wherein the first interface is compliant to at least one version of a Society of Automotive Engineers (SAE) J1962 standard.

9. The programming assist device of claim 8, wherein the second interface is compliant to at least one version of a Society of Automotive Engineers (SAE) J1962 standard.

10. The programming assist device of claim 8, wherein the second interface is a wireless interface.

11. The programming assist device of claim 8, wherein the second interface is a personal area network (PAN) interface.

12. The programming assist device of claim 5, wherein the controller circuitry is further configured for:
determining a second voltage abnormal condition associated with the second voltage signal; and
activating the output shutoff circuitry upon determining the second voltage abnormal condition.

13. The programming assist device of claim 5, wherein the power converter circuitry is configured as a voltage doubling converter.

14. The programming assist device of claim 13, wherein the power converter circuitry is configured as a charge pump direct current (DC) to DC converter.

15. The programming assist device of claim 1, wherein the vehicle diagnostic device includes at least one of a smartphone, a smart tablet, a smart watch, a laptop, and a personal computer for executing a vehicle diagnostic application.

16. The programming assist device of claim 1, wherein the vehicle diagnostic device includes at least one server executing a vehicle diagnostic application.

17. The programming assist device of claim 16, wherein the vehicle diagnostic device further includes a client device communicatively coupled with the at least one server executing the vehicle diagnostic application.

18. The programming assist device of claim 1, wherein the vehicle diagnostic device includes an OBD interface device configured to be electrically coupled with the second interface and communicatively coupled with a computing device executing a vehicle diagnostic application.

19. A method of operating a programming assist device having power converter circuitry, the method comprising:
electrically coupling a first interface of the programing assist device with an on-board diagnostics (OBD) port of a vehicle;
electrically coupling a second interface of the programming assist device with a vehicle diagnostic device; and
initiating a programming mode of the vehicle via the vehicle diagnostic device, wherein power converter circuitry configured for:
receiving a first voltage signal from a first pin of the first interface; and
providing a second voltage signal to a second pin of the first interface, wherein the second voltage signal is configured to facilitate the programming mode for the vehicle.

20. A method of assembling a programming assist device, the method comprising:
electrically coupling a first interface configured to be electrically coupled with an on-board diagnostics (OBD) port of a vehicle with power converter circuitry; and
electrically coupling a second interface configured to be communicatively coupled with a vehicle diagnostic device with the power converter circuitry, wherein the power converter circuitry is configured for:
receiving a first voltage signal from a first pin of the first interface; and
providing a second voltage signal to a second pin of the first interface, wherein the second voltage signal is configured to facilitate a programming mode for the vehicle.

* * * * *